US008391552B1

(12) United States Patent
Shaffer

(10) Patent No.: US 8,391,552 B1
(45) Date of Patent: Mar. 5, 2013

(54) METHOD OF PARTICLE TRAJECTORY RECOGNITION IN PARTICLE FLOWS OF HIGH PARTICLE CONCENTRATION USING A CANDIDATE TRAJECTORY TREE PROCESS WITH VARIABLE SEARCH AREAS

(75) Inventor: Franklin D. Shaffer, Belle Vernon, PA (US)

(73) Assignee: U.S. Department of Energy, Washington, DC (US)

( * ) Notice: Subject to any disclaimer, the term of this patent is extended or adjusted under 35 U.S.C. 154(b) by 524 days.

(21) Appl. No.: 12/765,317

(22) Filed: Apr. 22, 2010

(51) Int. Cl.
*G06K 9/00* (2006.01)
(52) U.S. Cl. .................. 382/103; 382/107; 356/28
(58) Field of Classification Search .................. None
See application file for complete search history.

(56) References Cited

U.S. PATENT DOCUMENTS

| 5,905,568 | A |  | 5/1999 | McDowell et al. |
|---|---|---|---|---|
| 5,974,901 | A |  | 11/1999 | Zborowski et al. |
| 7,612,870 | B2 | * | 11/2009 | Graff et al. .................. 356/3.13 |
| 7,853,065 | B2 | * | 12/2010 | Mori et al. .................. 382/141 |
| 2008/0137992 | A1 | * | 6/2008 | Mori et al. .................. 382/312 |
| 2009/0054788 | A1 | * | 2/2009 | Hauger et al. .................. 600/476 |
| 2011/0299738 | A1 | * | 12/2011 | Wieneke .................. 382/107 |

OTHER PUBLICATIONS

McDowell, G. "A globally Optimal Particle Tracking Technique for Stereo Imaging Velocimetry Experiments" NASA/TM—2008-215153. Apr. 2008, Available at: http://gltrs.grc.nasa.gov.*
Bhaskar, H.; Kingsland, R. L.; Singh, S.; Welsh, G.; Tavare, J.; , "Multiple Cell-Particle Tracking Based on Multi-Resolution Block-Matching using Genetic Algorithm," Advances in Medical, Signal and Information Processing, 2006. MEDSIP 2006. IET 3rd International Conference On , vol., no., pp. 1-4, Jul. 17-19, 2006 URL: http://ieeexplore.ieee.org/sta.*
C. J. Veenman et al., "Establishing motion correspondence using extended temporal scope," Artificial Intelligence 145 (2003) 227-243.
Ingemar J. Cox, "A Review of Statistical Data Association Techniques for Motion Correspondence," International Journal of Computer Vision, 10:1, 53-66 (1993).
Y. G. Guezennec et al., "Algorithms for fully automated three-dimensional particle tracking velocimetry," Experiments in Fluids 17 (1994) 209-219.

* cited by examiner

*Primary Examiner* — Claire X Wang
*Assistant Examiner* — Thomas A James
(74) *Attorney, Agent, or Firm* — James B. Potts; Mark P. Dvorscak; John T. Lucas

(57) ABSTRACT

The application relates to particle trajectory recognition from a Centroid Population comprised of Centroids having an (x, y, t) or (x, y, f) coordinate. The method is applicable to visualization and measurement of particle flow fields of high particle. In one embodiment, the centroids are generated from particle images recorded on camera frames. The application encompasses digital computer systems and distribution mediums implementing the method disclosed and is particularly applicable to recognizing trajectories of particles in particle flows of high particle concentration. The method accomplishes trajectory recognition by forming Candidate Trajectory Trees and repeated searches at varying Search Velocities, such that initial search areas are set to a minimum size in order to recognize only the slowest, least accelerating particles which produce higher local concentrations. When a trajectory is recognized, the centroids in that trajectory are removed from consideration in future searches.

28 Claims, 14 Drawing Sheets

METHOD OF PARTICLE TRAJECTORY RECOGNITION IN PARTICLE FLOWS OF HIGH PARTICLE CONCENTRATION USING A CANDIDATE TRAJECTORY TREE PROCESS WITH VARIABLE SEARCH AREAS

STATEMENT OF GOVERNMENTAL SUPPORT

The United States Government has rights in this invention pursuant to the employer-employee relationship of the Government to the inventors as U.S. Department of Energy employees and site-support contractors at the National Energy Technology Laboratory.

FIELD OF THE INVENTION

The application relates to particle trajectory recognition from a Centroid Population comprised of Centroids having an (x, y, t) or (x, y, f) coordinate. The method is applicable to visualization of high concentration particle flow fields. In one embodiment, the centroids are generated from video particle images. The application encompasses digital computer systems and distribution mediums implementing the method disclosed.

BACKGROUND OF THE INVENTION

The motion of flowing particles is often visualized and measured by recording a particle flow field with a standard or high speed camera. The recorded video is transferred to a computer, then particle images on the videos camera frames are recognized and their locations stored. From the stored locations of particle images on each camera frame, sequences of particle images through successive camera frames are automatically recognized as particle trajectories. The difficulty, complexity, and computer time required to automatically recognize particle trajectories increases exponentially with concentration of particles (number of particles per unit area on the camera frames).

A large number of different methods have been developed and successfully applied to automatically recognize the trajectories of particles in flow fields of low to moderate particle concentration. These techniques are often referred to as Particle Image Velocimetry (PIV) or Particle Tracking Velocimetry (PTV), based on how the particle images are exposed onto successive camera frames and how many frames the trajectories are recognized through (usually two frames for PIV and many more than two for PTV). Both camera/computer-hardware and image processing algorithms for particle flow measurements are being constantly improved upon in terms of accuracy, spatial and temporal resolution, and dynamic range.

In general, all these methods recognize particle trajectories by tracking some characteristic of particle images through a number of chronologically successive camera frames. One of the most commonly used methods, often referred to as Particle Image Velocimetry (PIV), recognizes a pair of images of the same particle over a short period of time. The pair of images may be on the same camera frame (by double exposure of a camera frame) or two consecutive frames. PIV is usually used to measure the motion of a gas or fluid by using particles that are aerodynamically small enough to follow the gas/fluid flow. Numerous methods have been developed to recognize these two-image PIV trajectories, including cross-correlation techniques. Another class of trajectory recognition methods identifies distinguishing features of particle images, such as shape, color, or brightness, and uses the distinguishing features to recognize the same particle through successive camera frames. Recognizing trajectories through multiple camera frames is often called PTV. Many trajectory recognition methods for PTV attempt to recognize particle trajectories by extrapolation techniques.

Most trajectory recognition methods work reasonably well if the concentration of particles in the particle flow field is low. With low particle concentrations, the particle concentration is not high enough to occlude optical access for the camera view or to block illumination. Also, with low particle concentrations, particle trajectories do not repeatedly cross each other and particle images do not repeatedly overlap. However, particle flows of high concentration present a number of problems not found in low concentrations: optical access is almost completely occluded, almost all particle trajectories cross other trajectories, a high percentage of particle images overlap (either on the same frame or across frames), and some particles are not illuminated because they are in the shadow of other particles.

Trajectory recognition becomes exponentially more difficult as particle concentration increases. For a specific particle, there may be numerous particle images in the next camera frame that may or may not correspond (i.e., be the next image created by the same specific particle). This is referred to as correspondence ambiguity, and it increases rapidly with particle concentration.

A common approach is to use priori knowledge of the particle flow behavior to limit the area searched in successive camera frames for particle images corresponding to a specific particle. Areas of successive camera frames are searched for the next instances of a particle along its trajectory by extrapolating particle motion from preceding frames. Limiting the areas searched in successive frames reduces the number of particle images in consideration, and thus the number of correspondence ambiguities.

If the temporal scope of the tracking is extended to three or more frames, the problem becomes a multidimensional assignment problem. For a search originating from a single particle, if N particles are found in each search area of subsequent frames, the number of searches in a subsequent frames grows as N to a power equal to the number of frames since the originating particle, or $N^{(number\ of\ frames)}$. Particle trajectories usually extend through at least four or five frames, but typically they extend through tens or even hundreds of frames. Additionally, with high concentration particle flows, several particle images may be found in each search area. As an example of the increasing correspondence ambiguity at high particle concentrations, if, for example, 2 particles are found in each search area, after 5 frames the number of particles included in search areas by frame 5 is $2^5$ or 32. If N=3, after 10 frames, the number of particles in consideration by frame 5 is more than 50,000.

Problems such as these are known to be NP-complete, i.e., there is no efficient algorithm to compute their solution. See Nemhauser, et al. *Integer and Combinatorial Optimization*, John Wiley and Sons, Inc., New York (1999). However, approximate solutions can be found using greedy search techniques and other heuristics. See, e.g., Veenman et al, "Establishing motion correspondence using extended temporal scope." *Artificial Intelligence*, 145(1-2):227.243. The complexity of the correspondence analysis significantly increases due to the extended temporal scope, and the combinatorial techniques become computationally expensive. On the other hand, these techniques are able to resolve crossing trajectories and find an optimal set of trajectories even in the presence of particle occlusions and losses of particle images due to other issues such as overlapping or shadowing.

In an algorithm generally termed Multiple Hypothesis Tracking (MHT), multi-target tracking is performed using a series of hypotheses, where each hypothesis generates a series of candidate trajectories. A candidate trajectory is defined to be a sequence of images that are assumed to originate from the same particle. Thus, each hypothesis predicts the location (e.g., in an image plane) of a set of expected particle locations, and these are compared with actual images detected in the next camera frame. Each subsequent "child" hypothesis represents one possible interpretation of the new set of measurements and together with its "parent" hypothesis, represents one possible interpretation of all past measurements. MHT may also attempt to allow for missing and false detections. Consequently, as the number of measurements increases, the hypothesis tree generated from each originating particle increases rapidly, and methods which attempt to optimize a solution globally, over all measurements, requires prohibitive computational resources. This is a fundamental consideration in particle trajectory recognition algorithms and can place a severe restraint on the concentration of particles to be tracked and the number of successive frames included in the global solution.

In particle trajectory recognition applications, methods exist to restrain the combinatorial explosion which results as the number of frames and the population density of particles increases. Equivalent sliding window algorithms have been developed, which match points using a limited temporal scope. Another common approach is to eliminate trajectories from the hypothesis tree through application of path coherence, and to discard trajectories whose orientation is incompatible with a dominant orientation of the surrounding vectors. Other approaches utilize a "track error" system, in which an error coefficient is established for a track based on the deviation of a particle position from that expected by the two succeeding particle positions in the track. The track is rejected as a reasonable possibility when the summation of the error coefficients for the track exceeds a threshold value.

The method disclosed herein addresses the inherent disadvantages of the foregoing methods by utilizing priori knowledge of particle flow behavior while limiting the size, location, and shape of search areas in successive frames based on applying limits to particle velocity and acceleration. Trajectory recognition is first attempted on all particle images in a video using very small search areas, and when a trajectory is recognized, the particle images in the trajectory are removed from further searches. After all particle images in a video have been searched using the smallest search areas, the search areas are increased slightly by slightly relaxing the limits on particle velocity and acceleration and again, the images of recognized trajectories are removed from consideration in future searches with larger search areas. The process of recognizing trajectories using gradually increasing search areas continues until the search area reaches a size that exceeds a size corresponding to the maximum particle velocity or the size of the field-of-view. This iterative process, starting with the most severe restrictions on size and shape, recognizes the slowest, least accelerating particles first. This greatly reduces the difficulty and computational requirements of particle trajectory recognition, by initially recognizing the most problematic trajectories using uniquely defined search areas that are highly efficient at detecting such trajectories.

The approach of varying search areas based on limiting particle flow parameters is combined with other techniques, such as the use of imaginary images to compensate for lost images. The disclosure thus provides a highly efficient and accurate method for numerous real particle flow fields of research and industrial importance.

SUMMARY OF THE INVENTION

This method disclosed recognizes trajectories in a Centroid Population. In an embodiment, the trajectories are trajectories of particles in particle flows of high particle concentration. In high concentration flows a high percentage of particle trajectories cross each other over successive camera frames, and particle images are missing because of image overlap or image shadowing, either on the same frame or on successive frames. The high concentration particle flow may be recorded on a standard or high speed video, and the video may be moved to a digital computer system capable of implementing the method, where digital computer system quickly and accurately recognizes sequences of particle images in successive camera frames as real particle trajectories. The method has been applied to videos with more than 200,000 frames and containing more than 40 million particle images. Even for the largest videos, the method recognizes particle trajectories with high accuracy in short computation times, often in a few minutes on a personal computer.

The method may accomplish trajectory recognition using a combination of techniques. One of the main techniques is the formation of Candidate Trajectory Trees across successive camera frames. The most likely Candidate Trajectory in a Candidate Trajectory Tree is the longest (oldest) branch.

Another important technique utilized in this method is searching the entire Centroid Population repeatedly using search areas of varied size. Two types of search areas are used to grow Candidate Trajectory Trees: First Generation Search Areas and Descendant Search Areas. Each may be a function of a parameter called the Search Velocity.

For initial passes through a Centroid List, search areas are set to smaller sizes in order to recognize only the slowest, least accelerating particles. With each pass through the Centroid List, the search areas are incrementally increased in size to recognize slightly faster trajectories. This greatly improves recognition accuracy and reduces computation time, because slower trajectories produce higher local concentrations of particle images but have lower likelihood to cross other trajectories. When a particle trajectory is recognized, centroids comprising that trajectory are removed from consideration in future searches through the Centroid List, so that each successive pass has fewer and less concentrated centroids to analyze.

The input parameters required by users of the method are kept to a minimum, and the parameters may be are expressed in terms of particle flow properties such as velocity and acceleration.

Embodiments of the method include techniques to improve trajectory recognition, such as the use of imaginary centroids, descendant search areas which vary with the speed of a trajectory, and maximum and minimum trajectory lengths.

The novel method and principles of operation are further discussed in the following description.

DESCRIPTION OF THE PREFERRED EMBODIMENTS

Figure 1:
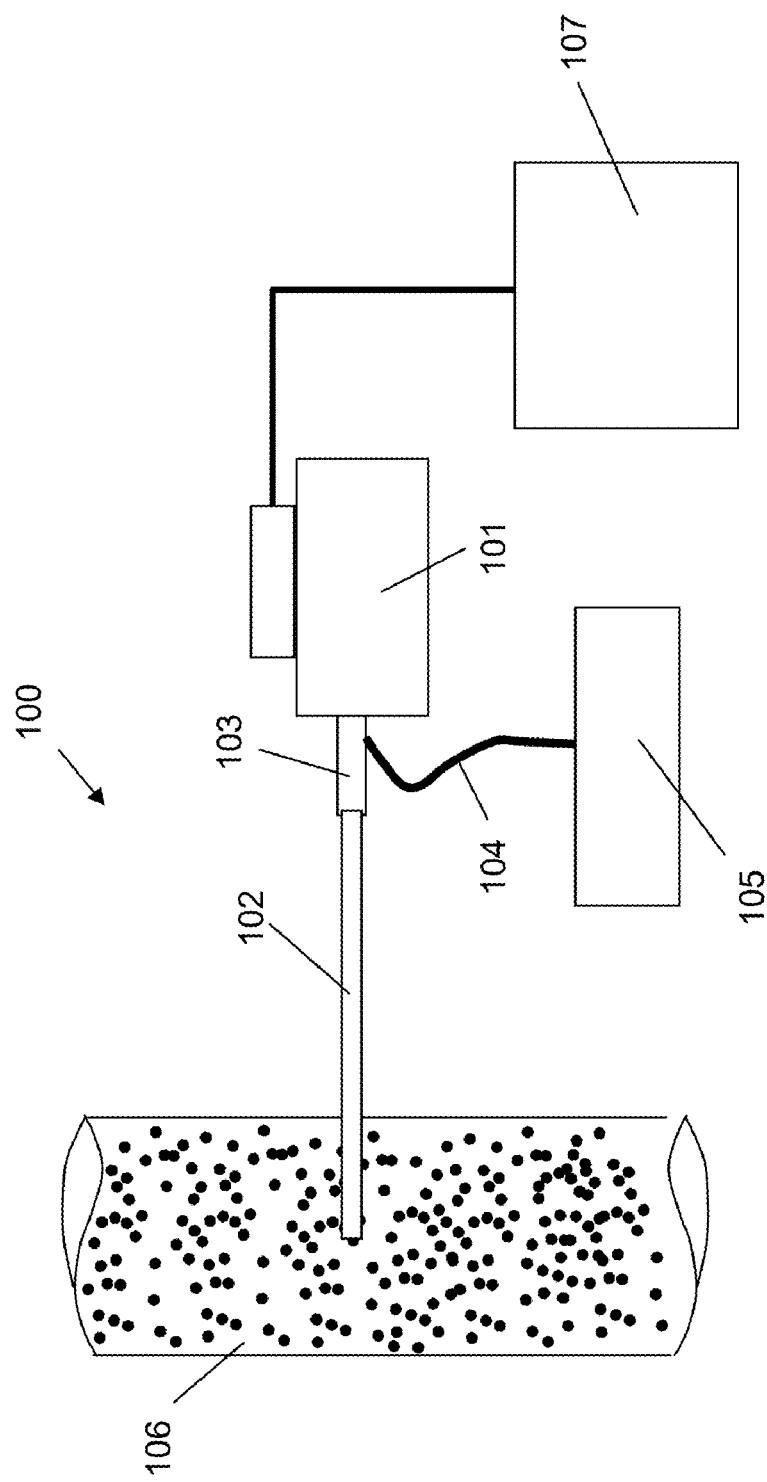
FIG. 1 illustrates an exemplary HSPI system.

The following description is provided to enable any person skilled in the art to use the method disclosed herein and sets forth the best mode contemplated by the inventor for carrying out the method. Various modifications, however, will remain readily apparent to those skilled in the art, since the principles of the present method are disclosed herein specifically to provide a method of particle image trajectory recognition in series of camera frames of particle flows with high particle concentrations.

Within the method, particle trajectory recognition may be based on priori knowledge of particle flow behavior, but the initial size, location, and shape of search areas in successive frames are severely limited. The limitation is achieved by basing the size, location, and shape of search areas on particle flow properties, namely particle velocity and acceleration.

Within the method, trajectories are realized for centroids in a centroid population. In one embodiment, the centroids are generated from video particle images, and trajectory recognition is first attempted on all particle images in a video using very small search areas, with the size and shape of the search areas defined by placing severe limits on particle velocity and acceleration (both axial and tangential acceleration). The size and shape of search areas are defined by a unique parameter called the search velocity. When a trajectory is recognized, the particle images in the trajectory are removed from further searches.

After all particle images in the video have been searched using the smallest search areas, the search areas are increased by slightly relaxing the limits on search velocity. The remaining particle images in the video are then searched again with the slightly increased search velocities. Again, the images of recognized trajectories are removed from consideration in future searches with larger search areas. The process of recognizing trajectories using gradually increasing search areas may continue until the search area reaches a size that exceeds a size that corresponds to a search velocity higher than the maximum particle velocity in the particle flow field.

Varying the size and shape of search areas, starting with the most severe restrictions on size and shape, recognizes the slowest, least accelerating particles first. The slowest, least accelerating particles have several unique characteristics that make recognizing and removing them first highly advantageous. First, the slowest particles produce the highest local particle concentrations, so if they are not removed first, they greatly increase the difficulty and computational requirements of particle recognition. Second, the slowest particles have the lowest probability of crossing other trajectories, so if they are removed initially using search areas that detect only the slowest particles, the complexity and increased correspondence ambiguity caused by crossing trajectories is mitigated. This greatly reduces the difficulty and computational requirements of particle trajectory recognition. Thus, this method recognizes the most problematic trajectories first using uniquely defined search areas that are highly efficient at detecting such trajectories.

The approach of varying search areas that are based on limits on particle flow parameters may be combined with other techniques, such as the use of imaginary images to compensate for lost images, and has been found to be highly efficient and accurate on numerous real particle flow fields of research and industrial importance.

The method may operate on a recorded video (sequence of chronological camera frames) of a particle flow field. Particle images in the camera frames may be recognized using established particle image recognition techniques and the geometric center of each particle.

If particles are suspended in a gas or fluid flow and they are aerodynamically small enough to follow the highest velocity gradients of the gas/fluid flow, particle trajectories can be used to measure the gas/fluid flow field itself. If particles do not follow the gas or fluid flow, only the particle motion is measured.

The method is effective for analysis of particle flow fields with high particle concentrations that consequently generate camera frames with high numbers of particle images per unit area of each frame. High particle concentrations can render a flow field opaque to the human eye and to standard video cameras. On video recordings of high concentration particle flows most trajectories cross over other trajectories and particle images frequently overlap other particle images, either on the same frame or through sequences of camera frames.

As used herein, the term "centroid" means a point having an (x, y, t) coordinate, where x and y are location coordinates that define the location of the centroid with respect to a fixed two-dimensional Cartesian coordinate system, and where t is a time coordinate indicating a time with respect to a fixed time reference at which the centroid is located at the x and y location coordinates. For example, where a centroid represents the location of the geometric center of an imaged particle on a single frame in a plurality of frames, and the x and y location coordinates define the location of the imaged particle on the single frame with reference to the field of view, and the time coordinate corresponds to a unique time identifier of the single frame in the plurality of frames. A centroid may be real or imaginary, as discussed infra.

As used herein, the term "Centroid Population" means a plurality of real centroids having (x, y, t) coordinates, where x and y are referenced to a coordinate origin consistent throughout the plurality of centroids, and where t is a member of a finite set of time coordinates, where each element in the finite set of time coordinates describes the time coordinate of at least one real centroid. For example, a Centroid Population comprised of real centroids representing imaged particles in a flow field captured in a plurality of frames, where each frame has an equivalent field of view and x and y are referenced to the equivalent field of view, and where each frame is separated from a chronologically adjacent frame by a time interval, such that each frame has a unique time identifier, and t is the unique time identifier of the frame depicting an imaged particle represented by a real centroid in the plurality of centroids. Further, as used herein, when a first time coordinate "immediately chronologically precedes" a second time coordinate, this means that the first time coordinate is chronologically earlier than the second time coordinate, and that no other time coordinate in the finite set of time coordinates is both chronologically earlier than the second time coordinate and chronologically later than the first time coordinate. Similarly, when one centroid immediately chronologically precedes another centroid, this means that the time coordinate of the one centroid immediately chronologically precedes the time coordinate of the another centroid. Further, as used herein, when a first time coordinate "immediately chronologically succeeds" a second time coordinate, this means that the first time coordinate is chronologically later than the second time coordinate, and that no other time coordinate in the finite set of time coordinates is both chronologically later than the second time coordinate and chronologically earlier than the first time coordinate. Similarly, when one centroid immediately chronologically succeeds another centroid, this means that the time coordinate of the one centroid immediately chronologically succeeds the time coordinate of the another centroid.

As used herein, the term "real centroid" means a centroid in a Centroid Population. For example, when the Centroid Population is generated from imaged particles in a flow field captured in a plurality of frames, all centroids in the Centroid Population are real centroids.

As used herein, the term "imaginary centroid" means a centroid artificially created when a real centroid is not found in a Descendant Search Area, where the imaginary centroid has a location coordinate within the area of the Descendant Search Area and where the imaginary centroid is assigned a time coordinate based on the generation of the Descendant Search Area. The imaginary centroid may be a member of a Trajectory Centroid Population, but may not be a member of a Centroid Population or a Centroid List.

As used herein, the term "Search Velocity" means a velocity in a finite set of velocities, where the finite set of velocities includes a minimum velocity and a maximum velocity as set elements, and where every other element in the finite set of velocities is greater than the minimum velocity and less than the maximum velocity. For example, a Search Velocity may be a velocity between a Minimum Search Velocity and a Maximum Search Velocity where the Minimum Search Velocity and the Maximum Search Velocity are parameters describing the predicted motion of a particle flow field.

As used herein, the term "Candidate Trajectory" means a path through two or more centroids, where the (x, y, t) coordinates of the two or more centroids are related by displacement and time constraints such that a particle moving at a given Search Velocity could physically traverse the Candidate Trajectory.

As used herein, the term "Trajectory Centroid Population" means a finite set of centroids consisting of the centroid at which a trajectory originates and all centroids through which the trajectory passes. No two centroids in a Trajectory Centroid Population may have a common time coordinate. A Trajectory Centroid Population always includes a 0-Generation Centroid, may include both real and imaginary centroids, and may include a Candidate Terminal Centroid or a Realized Terminal Centroid.

As used herein, the term "0-Generation Centroid" means a real centroid at which one or more trajectories originates in location and time, such that the 0-Generation Centroid has the earliest-in-time time coordinate among all centroids in a Trajectory Centroid Population.

As used herein, the term "Candidate Trajectory Tree" means one or more Candidate Trajectories having a common 0-Generation Centroid, such that all Candidate Trajectories making up the Candidate Trajectory Tree represent the possible path of a trajectory originating at the location and time coordinates of the 0-Generation Centroid given the displacement constraints imposed by a Search Velocity.

As used herein, the term "Candidate Terminal Centroid" means a real centroid at which one of the Candidate Trajectories comprising a Candidate Trajectory Tree terminates, such that no other centroid in the Trajectory Centroid Population of the Candidate Trajectory immediately chronologically succeeds the Candidate Terminal Centroid. Within this method, the Candidate Terminal Centroid has the latest-in-time time coordinate in the Trajectory Centroid Population of the Candidate Trajectory.

As used herein, the term "Realized Terminal Centroid" means a centroid having a latest-in-time time coordinate from among the Candidate Terminal Centroids in the Trajectory Centroid Populations of all Candidate Trajectories comprising a Candidate Trajectory Tree.

As used herein, the term "Realized Trajectory" means a Candidate Trajectory from among one or more Candidate Trajectories comprising a Candidate Trajectory Tree whose Trajectory Centroid Population includes a Realized Terminal Centroid. Within this method, the Realized Trajectory is the most probable trajectory from among the one or more Candidate Trajectories comprising a Candidate Trajectory Tree. The Trajectory Centroid Population of a Realized Trajectory always includes a 0-Generation Centroid, a Realized Terminal Centroid, and any other real or imaginary centroids through which the trajectory passes.

As used herein, the term "Centroid List" means a plurality of real centroids comprised of the real centroids in a Centroid Population less the real centroids comprising the Trajectory Centroid Populations of all Realized Trajectories. Within this method, the quantity of the real centroids comprising the Centroid List decreases as Realized Trajectories are defined during analysis at each Search Velocity, and the real centroids comprising the Trajectory Centroid Populations of the Realized Trajectories are removed from the Centroid List. As a result, no real centroid in the Trajectory Centroid Population of a Realized Trajectory is included in the Centroid List.

As used herein, the term "0-Generation Candidate" means a centroid which may or may not be a 0-Generation Centroid.

As used herein, the term "First Generation Search Area" means a search area centered at the location coordinate of a 0-Generation Candidate and based on a Search Velocity and a time interval, where the time interval is the chronological interval between the time coordinate of the 0-Generation Candidate and the time coordinate of a centroid in the Centroid List which immediately chronologically succeeds the time coordinate of the 0-Generation Candidate. For example, the time interval may be a constant time interval separating immediately chronologically adjacent elements in the finite set of time coordinates in a Centroid List, or may be the constant time interval between camera frames depicting a plurality of imaged particles. The First Generation Search Area may be a circle centered on the 0-Generation Candidate and having a radius equal to the Search Velocity times the constant time interval.

As used herein, the term "1-Generation Centroid" means a real centroid in the Centroid List having a location coordinate within the area of a First Generation Search Area, and having a time coordinate that immediately chronologically succeeds the time coordinate of the 0-Generation Candidate. Within this method, when a 1-Generation Centroid exists within the First Generation Search Area of a 0-Generation Candidate, the 0-Generation Candidate is designated as a 0-Generation Centroid.

As used herein, the term "Active Candidate Trajectory" means a Candidate Trajectory in a Candidate Trajectory Tree, where the Trajectory Centroid Population of the Candidate Trajectory does not include a Candidate Terminal Centroid.

As used herein, the term "first centroid" means a real or imaginary centroid in the Trajectory Centroid Population of an Active Candidate Trajectory having the latest-in-time time coordinate of all centroids in the Trajectory Centroid Population of the Active Candidate Trajectory.

As used herein, the term "second centroid" means a real or imaginary centroid in the Trajectory Centroid Population of an Active Candidate Trajectory having a first centroid, where the time coordinate of the second centroid immediately chronologically precedes the time coordinate of the first centroid.

As used herein, the term "Descendant Search Area" means a bounded area based on the location coordinates of one or more centroids in an Active Candidate Trajectory's Trajectory Centroid Population.

As used here, the term "Candidate Descendant" means a real centroid on the Centroid List having location coordinates within a Descendant Search Area, where the Descendant Search Area is based on the location coordinates of one or more centroids in an Active Candidate Trajectory's Trajectory Centroid Population, and where the real centroid has a time coordinate that immediately chronologically succeeds the time coordinate of the chronologically latest centroid in the Active Candidate Trajectory's Trajectory Centroid Population, or alternatively the term "Candidate Descendant" means an imaginary centroid placed within a Descendant Search Area, where the Descendant Search Area is based on the location coordinates of one or more centroids in an Active Candidate Trajectory's Trajectory Centroid Population, and where the imaginary centroid is assigned a time coordinate equal to a time coordinate of a centroid in the Centroid List that immediately chronologically succeeds the time coordinate of the chronologically latest centroid in the Active Candidate Trajectory's Trajectory Centroid Population.

As used here, the term "maximum centroid count" means the maximum number of centroids allowed in a Trajectory Centroid Population of a Candidate Trajectory.

As used here, the term "minimum centroid count" means the minimum number of centroids allowed in a Trajectory Centroid Population of a Realized Trajectory.

Principles of the Method

The disclosure herein operates on a Centroid Population, where the Centroid Population is comprised of a plurality of real centroids, and where each real centroid has both a location coordinate and a time coordinate. The location coordinate defines the location of the centroid with respect to a fixed two-dimensional coordinate system, and the time coordinate indicates a time with respect to a fixed time reference at which the centroid is located at the x and y location coordinates. The time coordinate is a member of a finite set of time coordinates. In one embodiment, the Centroid Population is obtained using a High Speed Particle Imaging (HSPI) system, and each element in the finite set of time coordinates is separated from an immediately chronologically adjacent element by a constant time interval.

Figure 2:
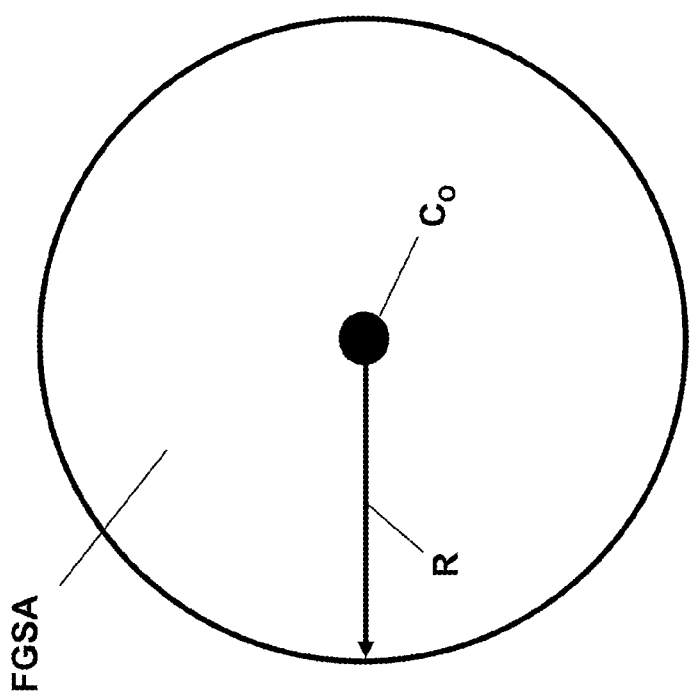
FIG. 2 illustrates an exemplary First Generation Search Area around a 0-Generation Candidate.

An HSPI system that can operate in particle flow fields with high particle concentrations is shown as a schematic in FIG. 1 and as a real operating prototype system in FIG. 2. FIG. 2 shows the HSPI system applied to a cold-flow circulating fluidized bed experiment that simulates particle flow fields in advanced gasification systems.

The HSPI system 100 uses an endoscope 102 to probe into particle flow fields and view particles inside the flow field. Standard camera lens may be used instead of an endoscope, if the particle concentration is not high enough to render the flow field completely opaque and if visual access (a transparent boundary or window) into the flow field is available. Standard camera lens may also be used to visualize and measure particle motion against a transparent boundary at particle concentrations up to the maximum possible concentration. For moderate particle concentrations, a standard camera lens may see into a particle flow for a limited depth.

This system is suitable for generating a plurality of chronologically successive camera frames of particles inside an opaque flow field 106. The HSPI system 100 has a digital imaging camera 101, which may be a high speed camera operating at higher than standard frame rates coupled to image magnification and focusing optics 103. The endoscope 102 (also called a borescope) can be used in addition to magnification and focusing optics 103 to probe into high concentration particle flow fields. As stated above, in some cases a standard camera lens system may be used instead of an endoscope. A light source 105 provides illumination of particles via the endoscope 102 illumination system, which may typically be a bundle of fiber optics formed into a circular shape at the outer edge of the endoscope 102. An optical light guide 104 transmits light to the endoscope 102 illumination system. Light source 105 may provide light at wavelengths corresponding to the image sensor of digital imaging camera 101.

High speed video data can be viewed in real-time on a computer laptop 107 and the raw (unanalyzed) high speed video data may be recorded on computer 107 or onto an external high speed data recording device.

After a high speed video of a particle flow field is recorded by the high speed camera, the high speed video may be transferred to a computer and analyzed with computer software to automatically recognize particle images and particle trajectories.

Computer Laptop 107 is a representative digital computer system that can be programmed to perform the method of this invention. Other digital computer systems can also be employed to perform the method disclosed, and to the extent that a particular digital computer system is capable of performing the method disclosed, it is equivalent to Computer Laptop 107, and within the scope and spirit of this disclosure. Once they are programmed to perform particular functions pursuant to instructions from program software that implements the method disclosed, such digital computer systems in effect become special-purpose computers particular to the method disclosed. The techniques necessary for this are well-known to those skilled in the art of computer systems.

Similarly, computer programs implementing the method disclosed may be distributed to users on a distribution medium such as floppy disk, CD-ROM, or via download from internet servers. From there, they may be copied to a hard disk or a similar intermediate storage medium. When the programs are to be run, they will be loaded either from their distribution medium or their intermediate storage medium into the execution memory of the digital computer system, configuring the digital computer system to act in accordance with the method of this invention. All these operations are well-known to those skilled in the art of computer systems. The term "computer-readable medium" encompasses distribution media, intermediate storage media, execution memory of a computer, and any other medium or device capable of storing for later reading by a computer a computer program implementing the method disclosed.

Particle trajectory recognition typically involves two primary steps: particle image recognition and trajectory recognition. This process can be a very computationally intensive because high speed videos often consist of 10,000 to 1,000,000 frames with video file sizes in the range of 10-100 Gigabytes. Tens of millions of particle images may be recorded in each high speed video.

Particle Image Recognition

An HSPI system produces raw image data in a video file comprised of chronologically consecutive camera frames showing images of particles as they move along their trajectories in a particle flow field. In a typical HSPI system, the raw image data is comprised of thousands or millions of camera frames (digital photographs) with each frame depicting numerous (in the range of tens to thousands) of particle images.

After a video file is moved from a high speed camera to a computer, the frames of the high speed video file may be analyzed to automatically recognize particle images in each frame. After the particle images are recognized, the geometric center of each particle image is calculated. The geometric center may treated as the centroid within this method, such that the centroids of recognized particle images produce a plurality of centroids in a Centroid Population.

Each centroid in the Centroid Population can therefore be described with an (x, y, f) coordinate, where x and y are location coordinates describing the location of the imaged particle with respect to a fixed point of reference such as the camera field of view, and where f is the camera frame on which the imaged particle appears. Similarly, coordinates can be expressed in terms of a time t corresponding to each camera frame f, such that each centroid in the Centroid Population is described with an (x, y, t) coordinate.

The method as disclosed herein is not dependent on the methodology by which the plurality of frames depicting imaged particles, for example, is processed to produce a Centroid Population, and any of the methods known in the art may be utilized. Particle image recognition may be accomplished through a series of image processing and enhancement steps, including background subtraction, Fast Fourier Transforms, median and maximum filters, automatic thresholding/segmentation, watershed filters, or other methods known in the art. Further, the method is not dependent on the phenomena which the Centroid Population represents. The phenomena may be a particle flow field in an existing system as described supra, however the method is effective for determining Realized Trajectories in any Centroid Population where each centroid is described with an (x, y, f) coordinate or (x, y, t) coordinate, where x and y are location coordinates that define the location of the centroid with respect to a fixed Cartesian two-dimensional coordinate system, and where f is a frame coordinate indicating the camera frame at which the centroid is located at the x and y location coordinates, or where t is a time coordinate indicating a time with respect to a fixed reference time at which the centroid is located at the x and y location coordinates.

Having obtained a Centroid Population either through use of a system such as HSPI system 100 or otherwise, particle trajectories from centroids in the Centroid Population may be recognized.

Particle Trajectory Recognition:

This method recognizes particle trajectories from the centroids populating a Centroid List. The particle trajectories are recognized from patterns within the chronologically ordered centroids created by a specific particle along its trajectory. The method recognizes trajectories based on dimensionless similarity parameters common to most high concentration particle flows, and analyzes the Centroid List based on a minimum search velocity, a maximum search velocity, and Search Velocities between the minimum and maximum search velocities as determined by an operator. The method initially establishes the Centroid List equivalent to the Centroid Population, then reduces the Centroid List under the uniqueness principle as each trajectory is realized.

The method utilizes a minimum number of exogenous user inputs expressed in terms of particle flow property limits such as particle velocity which are typically generally known by operators measuring a particle flow field. The method is highly effective for flow fields with high concentrations of particles and works equally well on particle flow fields of low particle concentration.

One of the primary techniques of the method is a Candidate Trajectory Tree growing process that identifies all sequences of centroids that could be a particle trajectory. Such sequences of centroids are called Candidate Trajectories.

The Candidate Trajectory Tree Growing Process

The Candidate Trajectory Tree growing process is executed on each and every centroid on the Centroid List, one centroid at a time, in a chronological order. When the Centroid List is generated by a system such as HSPI system 100, the Candidate Trajectory Tree growing process starts with the centroids in the earliest camera frame (having the earliest-in-time time coordinate) and ending with the centroids in the last camera frame (having the latest-in-time time coordinate). The process selects one centroid and uses extrapolation techniques and search areas to produce a tree of Candidate Trajectories originating at the selected centroid. Each Candidate Trajectory has a probability of being a Realized Trajectory originating from the selected centroid.

0-Generation Centroids and the First Generation Search Area:

This method recognizes trajectories by searching for sequences of centroids in consecutive frames or having chronologically sequential time coordinates that have a pattern similar to the pattern produced by the physics of real particle motion. This is accomplished by using a search method using search areas having their location, shape and size determined by particle flow properties, namely velocity and acceleration.

The trajectory recognition process begins by testing all centroids on the Centroid List in chronological order to determine if they are an originating centroid for a trajectory. The centroid under evaluation is referred to as a 0-Generation Candidate. Each centroid on the Centroid List is tested as a 0-Generation Candidate, starting with a centroid having an earliest-in-time time coordinate and ending with a centroid having a latest-in-time time coordinate. As a result, all centroids on the Centroid List are tested as 0-Generation Candidates, one-by-one, passing through the Centroid List chronologically.

The process begins by selecting a centroid on the Centroid List, where the centroid has a time coordinate equivalent to the earliest-in-time time coordinate $t_0$ (or earliest frame) from among all the centroids on the Centroid List, and designating that centroid a 0-Generation Candidate. Then a search is conducted at the chronologically succeeding time coordinate (or in next frame) for the next centroid of the same particle which created the 0-Generation Candidate. The frame containing the 0-Generation Candidate is the 0-Generation frame at time $t_0$. The next frame after the 0-Generation frame is the 1-Generation frame, at a time $(t_0+1)$, where $(t_0+1)$ immediately chronologically succeeds $t_0$. All centroids on the Centroid List contained in the 0-Generation frame, including the 0-Generation Candidate, have a time coordinate equal to $t_0$. Similarly, all centroids on the Centroid List contained in the 1-Generation frame have a time coordinate equal to $(t_0+1)$. The next centroid of the same particle which created the 0-Generation Candidate must occur in the 1-Generation frame.

It is understood that the method operates by sequential analysis of centroids on the Centroid List, and that the particular sequence designator utilized does not limit the method. The sequential order of the centroids may be designated by a time coordinate, the frame number of a frame in a plurality of frames captured over a period of time, or any other method of designation which allows centroids on the Centroid List to be arranged in a chronological sequence that reflects the phenomena the Centroid Population represents.

The 1-Generation frame is searched in an area called a First Generation Search Area. In one embodiment, the First Generation Search Area is circular in shape with a radius determined by assuming the particle which created the 0-Generation Candidate traveled at or less than a constant velocity between the 0-Generation and the 1-Generation frames. The constant velocity stems from exogenous user inputs, and is called the Search Velocity. In the particular embodiment, the radius of the First Generation Search Area is then the Search Velocity multiplied by the time between camera frames, $\Delta t$. FIG. 2 illustrates an First Generation Search Area FGSA having a radius R equal to the Search Velocity times $\Delta t$. At FIG. 2, the 0-Generation Candidate $C_0$ is shown as a circle, although it is actually a location point with coordinates (x,y,f) or (x,y,t). The 0-Generation Candidate is labeled as $C_0$, with the subscript designating that the 0-Generation Candidate is in the 0-Generation frame. The First Generation Search Area FGSA is in the 1-Generation frame.

Figure 3:
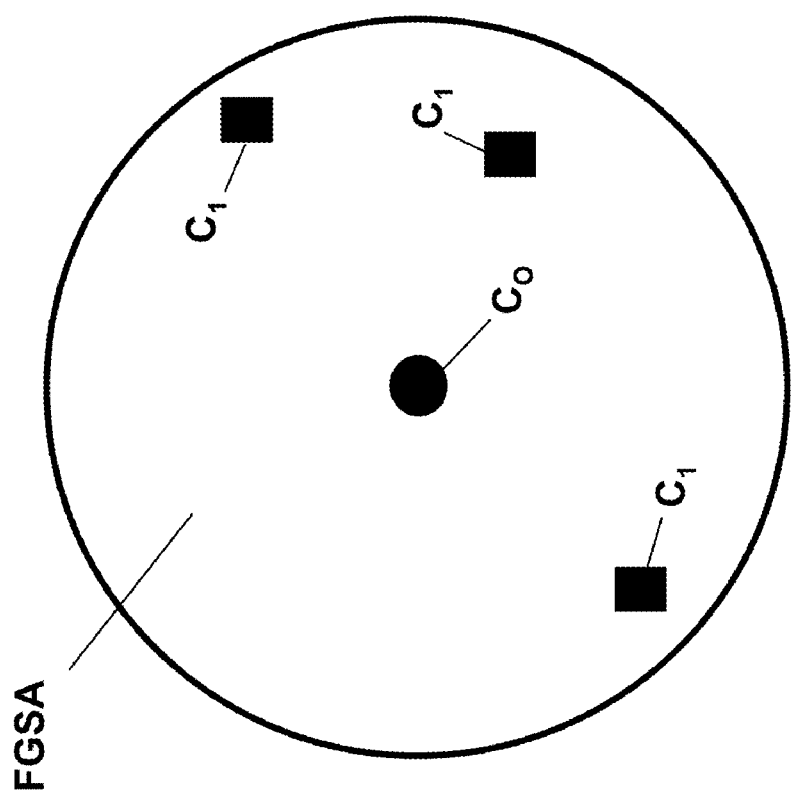
FIG. 3 illustrates an exemplary First Generation Search Area around a 0-Generation Candidate identifying 1-Generation Centroids.

As mentioned above, for each 0-Generation Candidate, a First Generation Search Area is formed in the 1-Generation frame to search for the centroids that could be the next instance of the same particle of the 0-Generation Candidate along its trajectory. FIG. 3 shows a First Generation Search Area FGSA with three 1-Generation centroids found inside the FGSA. Centroids found in the FGSA are referred to as 1-Generation Centroids, and they are shown as squares at FIG. 3 and denoted with $C_1$.

Figure 4A:
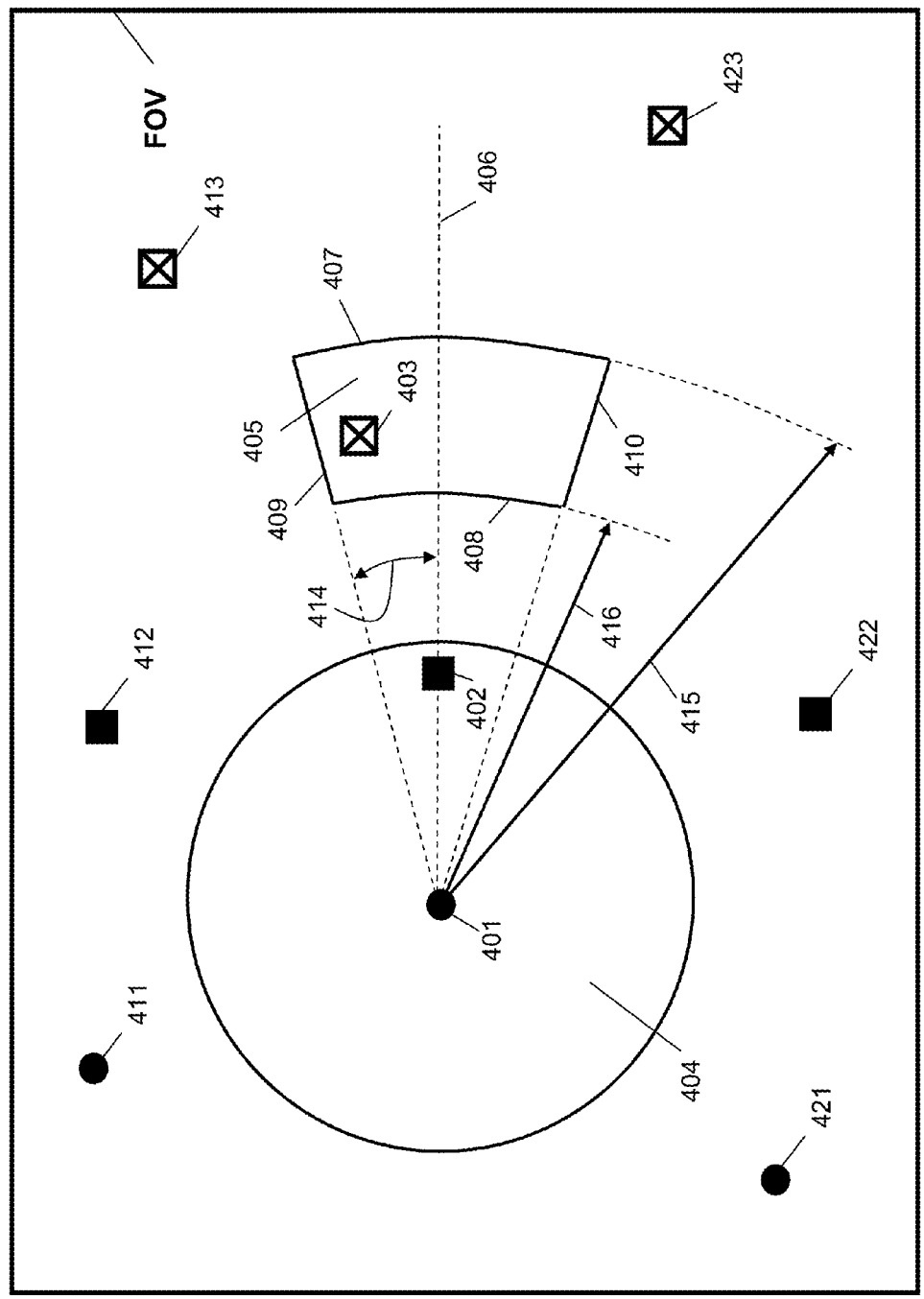
FIG. 4A illustrates analysis of an exemplary Centroid List.

Definitions and terms pertinent to the method disclosed herein are discussed and illustrated with reference to FIG. 4A. FIG. 4A depicts an example Centroid List from a Centroid Population representing a particle flow field and generated by a system such as HSPI system 100 in order to generate a plurality of frames separated by a constant time interval $\Delta t$. FIG. 4A illustrates a small area of a camera frame showing a small area of the camera's Field-of-View (FOV). The example Centroid List is comprised of centroids 401, 402, 403, 411, 412, 413, 421, 422, and 423, each having an (x,y,t) coordinate. The x and y location coordinates of each of the centroids are referenced to the FOV.

Chronologically, centroids 401, 411, and 421 are in the 0-Generation frame and have a time coordinate of $t_0$. Within the method, $t_0$ represents the earliest-in-time time coordinate among the centroids in the Centroid List. As a result, $t_0$ is the time coordinate of a centroid in any 0-Generation frame where a 0-Generation Candidate is being evaluated for development of a Candidate Trajectory Tree. Centroids 402, 412, and 422 are in the 1-Generation frame and have a time coordinate of $(t_0+1)$, where $(t_0+1)$ immediately chronologically succeeds $t_0$. Centroids 403, 413, and 423 are in a 2-Generation frame and have a time coordinate of $(t_0+2)$, where $(t_0+2)$ immediately chronologically succeeds $(t_0+1)$. As illustrated, the centroids represented at FIG. 4A makes up an example Centroid List under evaluation at time $t_0$. At FIG. 4A, centroids having a time coordinate of $t_0$ are shown as solid circles, centroids having a time coordinate of $(t_0+1)$ are shown as solid squares, and centroids having a time coordinate of $(t_0+2)$ are shown as squares with an X inside.

At FIG. 4A, the time coordinates of the example Centroid List are chronologically separated by a constant time interval $\Delta t$, such that $(t_0+1)=t_0+\Delta t$ and $(t_0+2)=(t_0+1)+\Delta t$, however this is not a requirement of the method. Within the method, it is only necessary that $(t_0+1)$ immediately chronologically succeeds $t_0$, and that $(t_0+2)$ immediately chronologically succeeds $(t_0+1)$.

Within the method disclosed, a 0-Generation Centroid is the centroid at which a candidate trajectory originates in location and time. A 0-Generation Candidate is a centroid which may or may not be a 0-Generation Centroid. In a particular embodiment, a First Generation Search Area is a circular search area centered at the location coordinate of a 0-Generation Candidate, and which has a radius equal to a Search Velocity times a time interval, where the time interval is the chronological difference between the 0-Generation Candidate and an immediately chronologically succeeding centroid. The time interval between the 0-Generation centroid and an immediately chronologically succeeding centroid may be, for example, a constant time period between camera frames in a plurality of frames depicting imaged particles. With reference to FIG. 4A, centroids 401, 411, 421, 402, 412, 422, 403, 413, and 423 are centroids of imaged particles depicted by a plurality of frames with field of view FOV and separated in time by a constant time interval.

FIG. 4A illustrates a First Generation Search Area 404 defined around 0-Generation Candidate 401 where First Generation Search Area 404 has a radius equal to a first Search Velocity times the constant time interval between frames. First Generation Search Area 404 therefore defines the maximum displacement that a particle traveling from the location coordinate of 0-Generation Candidate 401, at the first Search Velocity and over the time interval $\Delta t$, could physically traverse. Thus, First Generation Search Area 404 defines all possible locations of the next instance of the same particle which created the 0-Generation Candidate, if the particle traveled at a velocity lower than or equal to the first Search Velocity.

A 1-Generation Centroid is a real centroid having a location coordinate within First Generation Search Area 404 and having a time coordinate immediately chronologically subsequent to the 0-Generation Candidate, as previously defined. With reference to FIG. 4A, centroid 402 lies within First Generation Search Area 404 and is in a 1-Generation frame with a time coordinate $(t_0+1)$, and is therefore a 1-Generation Centroid with respect to 0-Generation Candidate 401. Within the method, because centroid 402 has been identified as a 1-Generation Centroid, the 0-Generation Candidate, centroid 401, is established as a 0-Generation Centroid. Correspondingly, a Candidate Trajectory exists which includes in its Trajectory Centroid Population centroids 401 and 402, where centroid 401 is the 0-Generation centroid and centroid 402 is the 1-Generation Centroid, as previously defined. Further, the Candidate Trajectory is an Active Candidate Trajectory because a Candidate Terminal Centroid, defined as a real centroid at which one of the candidate trajectories comprising a Candidate Trajectory Tree terminates, has not yet been identified.

With reference to the first Search Velocity, this result states that of the centroids in the Centroid List having a time coordinate immediately chronologically subsequent to centroid 401—namely centroids 402, 412, and 422—centroid 402 has a location and time coordinate that a particle traveling from the location of centroid 401 could achieve under the constraints imposed by the first Search Velocity and the time interval Δt, whereas achieving the location and time coordinate of either centroid 412 or centroid 422 would require a particle velocity in excess of the first Search Velocity.

Having established centroid 401 is a 0-Generation centroid and centroid 402 is a 1-Generation Centroid, and having defined a Candidate Trajectory having a Trajectory Centroid Population consisting of centroids 401 and 402, and having determined that the Candidate Trajectory is an Active Candidate Trajectory, the next chronological generation of centroids are evaluated as potential Candidate Descendants of the Active Candidate Trajectory. The evaluation for Candidate Descendants proceeds by generating a Descendant Search Area, where the Descendant Search Area is a bounded area based on the location coordinates of one or more centroids in the Active Candidate Trajectory's Trajectory Centroid Population. In the particular embodiment shown at FIG. 4A, Descendant Search Area 405 is defined using a maximum radius 415, a minimum radius 416, and a maximum angle 414.

These dimensions are all derived directly from the particle flow properties of the particle flow used to generate the Centroid Population, namely particle axial and translational acceleration. With reference to FIG. 4A, Descendant Search Area 405 for the Active Candidate Trajectory whose Trajectory Centroid Population consists of centroids 401 and 402 is determined by:

i) Identifying the first centroid, where the first centroid is the real or imaginary centroid in the Trajectory Centroid Population of an Active Candidate Trajectory having the chronologically latest-in-time time coordinate among all real or imaginary centroids in the Active Candidate Trajectory's Trajectory Centroid Population, as previously defined. Within the method, all Active Candidate Trajectories will have a first centroid. Here, the first centroid is centroid 402.

ii) Identifying the second centroid, where the second centroid is a real or imaginary centroid in the Trajectory Centroid Population of the Active Candidate Trajectory having a first centroid, where second centroid immediately chronologically precedes the first centroid, as previously defined. Within the method, all Active Candidate Trajectories will have a second centroid. Here, the second centroid is centroid 401.

iii) Defining the descendant axis, where the descendant axis is a line passing through the location coordinates of the first centroid and the second centroid. FIG. 4A illustrates the descendant axis as descendant axis 406.

iv) Defining the maximum angle 414, the maximum radius 415, and the minimum radius 416, where the maximum radius 415 is greater than the minimum radius 416, and the minimum radius 416 is greater than a displacement from the location coordinates of the second centroid 401 to the location coordinates of the first centroid 402. The maximum radius 415 and minimum radius 416 may be constant values, or may be determined based on the location and time coordinates of first centroid 402 and second centroid 401. In one embodiment of the method disclosed herein, the maximum radius 415 is determined according to $R_{max}=D_0(2+A_{max})$ and the minimum radius 416 is determined according to $R_{min}=D_0(2-A_{min})$, where $D_0$ is the displacement between first centroid 402 and second centroid 401. $A_{min}$ and $A_{max}$ are dimensionless parameters describing maximum limits on axial acceleration along a trajectory, where $A_{min}$ and $A_{max}$ are greater than zero and $A_{min}<A_{max}$, as discussed infra. In this embodiment, Descendant Search Area 405 is centered at a location determined by assuming the particle continues at the same velocity it had between second centroid 401 and first centroid 402, so the center of Descendant Search Area 405 lies on descendant axis 406, at a distance from first centroid 402 equal to the distance between second centroid 401 and first centroid 402. Similarly, the maximum angle 414 is an angle representing a maximum limit on tangential acceleration along a trajectory, where the tangential acceleration is an angular quantity representing the maximum angle by which a trajectory is expected to deviate from a straight line. In the example of FIG. 4A, the maximum angle 414 is the maximum angle by which the Active Candidate Trajectory is expected to deviate from a straight line which includes centroids 401 and 402 over one camera frame time, Δt.

v) Bounding the Descendant Search Area 405 with first circular arc 407, second circular arc 408, first line segment 409, and second line segment 410 where:

a) first circular arc 407 has a radius originating at second centroid 401 and equal in length to maximum radius $R_{max}$ 415, and has an arc length equal to maximum radius 415 times twice the maximum angle 414, and where first circular arc 407 is located such that the first centroid 402 is between first circular arc 407 and the second centroid 401, and such that descendant axis 406 bisects first circular arc 407.

b) second circular arc 408 has a radius originating at second centroid 401 and equal in length to minimum radius $R_{min}$ 416, and has an arc length equal to minimum radius 416 times twice the maximum angle 414, and where second circular arc 408 is located such that first centroid 402 is located between second circular arc 408 and second centroid 401, and such that descendant axis 406 bisects second circular arc 407.

c) first line segment 409 extends from a first endpoint of first circular arc 407 to a first endpoint of second circular arc 408.

d) second line segment 410 extends from a second endpoint of first circular arc 407 to an endpoint of second circular arc 408 most proximate to the second endpoint, such that the first line segment 409 and the second line segment 410 do not intersect.

It is recognized that FIG. 4A illustrates a Centroid List having only the limited time coordinates of $t_0$, $(t_0+1)$, and $(t_0+2)$, and that as a result of the limited time coordinates, the first centroid at FIG. 4A is also the 1-Generation Centroid, and the second centroid at FIG. 4A is also the 0-Generation Centroid. However, it is understood that this stems from the limited time coordinates represented by the Centroid List of FIG. 4A, and that a Descendant Search Area such as Descendant Search Area 405 may be generated from any first centroid and any second centroid, provided that the first centroid is a real or imaginary centroid in a Trajectory Centroid Population of an Active Candidate Trajectory having the chronologically latest-in-time time coordinate among all real or imaginary centroids in the Active Candidate Trajectory's Trajectory Centroid Population, and provided that the second centroid is a real or imaginary centroid in the Trajectory Centroid Population of the Active Candidate Trajectory which immediately chronologically precedes the first centroid. If is further understood that Descendant Search Area 405 results from one embodiment of the method, and that a Descendant Search Area may be any bounded area based on the location coordinates of one or more centroids in an Active Candidate Trajectory's Trajectory Centroid Population.

As illustrated at FIG. 4A, centroid 403 is located within Descendant Search Area 405, and has a time coordinate that immediately chronologically succeeds the time coordinate of the chronologically latest centroid in the Active Candidate Trajectory's Trajectory Centroid Population on which Descendant Search Area 405 is based. Centroid 403 is therefore a Candidate Descendant for the Active Candidate Trajectory, as previously defined. Correspondingly, a Candidate Trajectory exists which includes in its Trajectory Centroid Population centroids 401, 402, and 403, where centroid 401 is the 0-Generation centroid.

With reference to the first Search Velocity, this result states that of the centroids in the Centroid List of FIG. 4A having a time coordinate that immediately chronologically succeeds centroid 402—namely centroids 403, 413, and 423—centroid 403 has a location and time coordinate that a particle traveling from the location of centroid 402 could achieve under the constraints imposed by the first Search Velocity, the descendant axis, the maximum radius, the minimum radius, the maximum angle, and the constant time interval, whereas achieving the location and time coordinate of either centroid 413 or centroid 423 would require an operation outside those constraints.

Within the limited Centroid List depicted at FIG. 4A, no centroids immediately chronologically succeed centroid 403 and as a result the Candidate Trajectory having a Trajectory Centroid Population of centroid 401, centroid 402, and centroid 403 terminates at centroid 403. Centroid 403 is thus a Candidate Terminal Centroid. A Candidate Terminal Centroid may be established based solely on the lack of any chronologically succeeding centroids in the Centroid List, as with centroid 403 at FIG. 4A, however additional criteria for the establishment of a Candidate Terminal Centroid exist, as will be explained infra. Further, within the limited Centroid List depicted at FIG. 4A, centroid 403 is a Realized Terminal Centroid.

Within the method as disclosed herein, because centroid 403 is a Realized Terminal Centroid, the Candidate Trajectory having a Trajectory Centroid Population of centroid 401, centroid 402, and centroid 403 is determined to be a Realized Trajectory. Within this method, the Realized Trajectory is the longest Candidate Trajectory in a Candidate Trajectory Tree, as determined by the chronologically latest time coordinate among the Candidate Terminal Centroids within the Candidate Trajectories. At FIG. 4A, the Realized Trajectory is the most probable path of a particle originating at the location and time coordinate of the 0-Generation Centroid 401, if the path is constrained to the (x, y, t) coordinates of the centroids in the Centroid List, and with the constraints imposed by the Search Velocity, the time interval $\Delta t$, and the limits on axial and tangential acceleration.

Figure 4B:
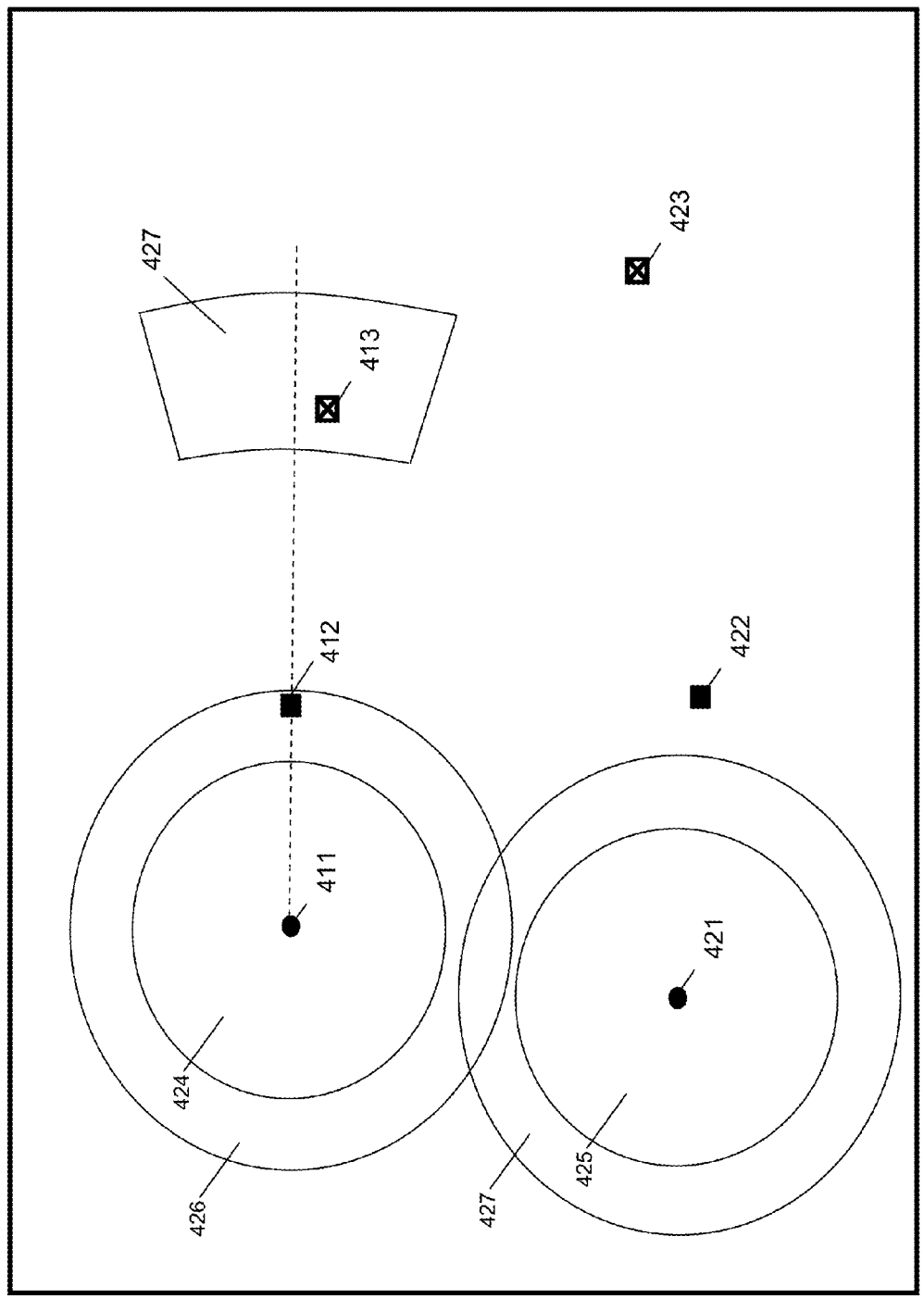
FIG. 4B illustrates continued analysis of the exemplary Centroid List of FIG. 4A.

Having established a Realized Trajectory, the centroids in the Trajectory Centroid Population of the Realized Trajectory—namely 0-Generation Centroid 401, centroid 402, and Realized Terminal Centroid 403—are removed from the Centroid List under the uniqueness principle employed by this method. In this limited example, following removal of these centroids, the Centroid List would consists of centroids 411, 421, 412, 422, 413, and 423, as shown at FIG. 4B.

Within the method, similar First Generation Search Areas based on the first Search Velocity are generated around the remaining centroids 411, 421, 412, 422, 413, and 423 in chronological order. With respect to the Centroid List of FIG. 4B, this results in next generating a First Generation Search Area around either centroid 411 or 421. Resultingly, at FIG. 4B, a First Generation Search Area 424 is defined around centroid 411, where the First Generation Search Area 424 is based on the first Search Velocity. As illustrated in FIG. 4B, no centroids having a time coordinate that immediately chronologically succeeds the time coordinate of centroid 411 is identified within First Generation Search Area 424. Therefore, at the first Search Velocity utilized, centroid 411 has no 1-Generation Centroids, and analysis of centroid 411 at the first Search Velocity ceases. Similarly at 4B, a First Generation Search Area 425 is defined around centroid 421—another of the earliest-in-time centroids remaining in the Centroid List—based on the first Search Velocity. In like manner, no 1-Generation Centroids for centroid 421 are identified at the first Search Velocity and analysis of centroid 421 at the first Search Velocity ceases. For the Centroid List of FIG. 4B, similar First Generation Search Areas based on the first Search Velocity would then be conducted for centroids 412 and 422, then centroids 413 and 423, reflecting the chronological order of the centroids remaining in the Centroid List.

Within the method, like analysis at a first Search Velocity is conducted for all centroids in the Centroid List in chronological order, and centroids are removed from the Centroid List following the establishment of each Realized Trajectory. In the Centroid List represented at FIGS. 4A and 4B, no centroids except centroid 401 have 1-Generation Centroids and a Realized Trajectory at the first Search Velocity. This would be unlikely in, for example, an analysis population representing a high particle concentration flow, but such a situation is utilized here for the purpose of illustration.

Having evaluated all centroids in the Centroid List at the first Search Velocity, the Search Velocity is increased to a second Search Velocity greater than the first Search Velocity, and First Generation Search Areas are established around each centroid in the Centroid List in chronological order, beginning with an earliest-in-time centroid. FIG. 4B shows First Generation Search Area 426 around centroid 411, where First Generation Search Area 426 is based on the second analysis Search Velocity and the constant time interval. As illustrated, First Generation Search Area 426 identifies 1-Generation Centroid 412 at the second Search Velocity. Descendant Search Area 427 is established using centroid 412 as the first centroid and centroid 411 as the second centroid, and centroid 413 is identified as a Candidate Descendant. For the same reasons as expressed for centroid 403, centroid 413 is a Candidate Terminal Centroid, and further is a Realized Terminal Centroid. A Realized Trajectory having a Trajectory Centroid Population consisting of 0-Generation Centroid 411, centroid 412, and Realized Terminal Centroid 413 is thereby established, and centroids 411, 412, and 413 are removed from the Centroid List. Like analysis at the second analysis Search Velocity is then continues for centroids remaining in the analysis population—now limited to centroids 421, 422, and 423—in chronological order, and centroids are removed from the analysis population following the establishment of each realized trajectory. FIG. 4B shows First Generation Search Area 427 around centroid 421 based on the second Search Velocity showing no 1-Generation centroids at the second Search Velocity. Similar First Generation Search Areas based on the second Search Velocity would then be conducted for centroid 422 then centroid 423, reflecting the chronological order of the centroids remaining in the Centroid List. In the Centroid List represented at FIG. 4B, no centroids except centroid 411 have 1-Generation centroids at the second analysis Search Velocity. The method then increases the Search Velocity to a third Search Velocity greater than the second Search Velocity, and the remaining centroids 421, 422, and 423 are analyzed at the third Search Velocity in chronological order, trajectories are realized, and the Centroid List is reduced, and so on, until analysis at a maximum Search Velocity is completed.

From the foregoing discussion, it can be appreciated that the method limits recognition and development of realized trajectories to those falling within the constraints of a given Search Velocity and the time interval between a 0-Generation Candidate and an immediately chronologically succeeding centroid in the Centroid List, and does not process trajectories falling outside those constraints until the Search Velocity is increased, thereby reducing required processing steps at each Search Velocity. Additionally, removing those centroids in the Trajectory Centroid Population of each Realized Trajectory as that Realized Trajectory is established further reduces the required processing steps. In conjunction, the method utilizes Descendant Search Areas based on the location coordinates of one or more centroids in an Active Candidate Trajectory's Trajectory Centroid Population to effectively limit the Candidate Descendants to the more probable centroids, thereby limiting the necessary quantity of Candidate Trajectories at each analysis, and further reducing the required processing steps.

Use of Descendant Search Areas to Grow Candidate Trajectories

Figure 5:
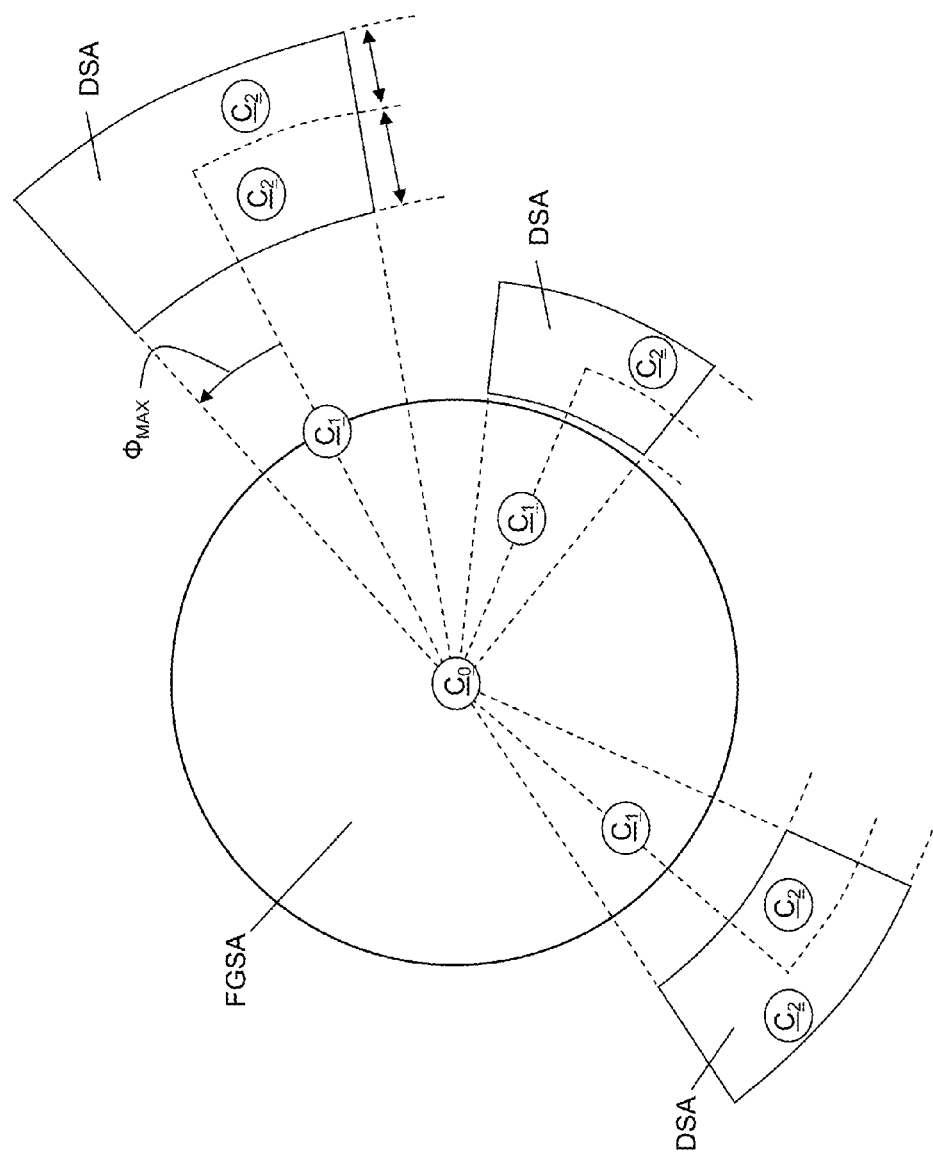
FIG. 5 illustrates an exemplary First Generation Search Area and exemplary Descendant Search Areas identifying Candidate Descendants.

A process called Candidate Trajectory Tree growing begins by pairing the 0-Generation Centroid with each 1-Generation Centroid found in the First Generation Search Area to form search areas in the 2-Generation frame, where the 2-Generation frame includes all centroids in the Centroid List which immediately chronologically succeed the each 1-Generation Centroid. Search areas in frames after the 1-Generation frame are referred to as Descendant Search Areas. This is illustrated at FIG. 5, showing First Generation Search Area FGSA, 0-Generation Centroid $C_0$ and 1-Generation Centroids denoted as $C_1$. Centroids which immediately chronologically succeed the 1-Generation Centroids are denoted by $C_2$, and are in the 2-Generation frame.

In one embodiment, the center of the Descendant Search Area is a location defined by extrapolating from the 0-Generation Centroid $C_0$ to the each 1-Generation Centroids $C_1$ and assuming that a particle travels at a constant velocity between the 0, 1, and 2-Generation frames. In terms of Descendant Search Area generation for this embodiment, each $C_1$ is a First Centroid and $C_0$ is a Second Centroid. Each resulting Descendant Search Area is denoted as DSA at FIG. 5. The boundaries of each DSA are formed by limiting the amount of acceleration (both translational and tangential) between the 1 and 2-Generation frames. The DSA's formed using the 0-Generation Centroid $C_0$ and each 1-Generation Centroid $C_1$ are shown at FIG. 5.

Momentum limits the amount of acceleration over the typically small time period between frames. To resolve the time dependent behavior of a Centroid Population generated with a system such as HSPI system 100, the time between frames may be chosen by the user to be small relative to time required for expected changes in particle velocity and acceleration. As a result, the Descendant Search Area may cover the most likely next location of a particle centroid for a particle moving along a trajectory.

In an embodiment, the location, size, and shape of a Descendant Search Area is determined by only three flow field parameters: a particle velocity between the 0-Generation and 1-Generation frames (having a time coordinate of $t_0$ and ($t_0$+1) respectively), a limit on axial acceleration, and a limit on tangential acceleration. In this embodiment, the velocity used to form each DSA is calculated using the centroids $C_0$ and $C_1$. The radial boundaries $R_{min}$ and $R_{max}$ of the Descendant Search Area are determined by setting limits on the translational acceleration and deceleration that a particle may experience. The angular boundaries of each DSA, defined by $\phi_{max}$ at FIG. 5, are set by assuming limits on the particle's angular acceleration.

At FIG. 5, Candidate Descendants found in each DSA are denoted as $C_2$. The Candidate Descendants each have a location coordinate within a DSA, and each have a time coordinate that immediately chronologically succeeds the chronologically latest centroid of the Candidate Trajectory on which the DSA is based. The search process continues into the next chronological frame by using the $C_1$ and $C_2$ centroid pairs to form new DSA's in the 3-Generation frame, with the $C_1$ centroids serving as second centroids and the $C_2$ centroids serving as first centroids, where each $C_2$ centroid in a given DSA is paired with the $C_1$ centroid on which the given DSA is based, such that the each Candidate Descendant—here the $C_2$ centroids—results in the generation of a DSA in the subsequent frame. In this embodiment, the use of two chronologically consecutive centroids along a Candidate Trajectory to form a DSA is the fundamental search process that is repeated to grow Candidate Trajectories. The process is repeated on subsequent frames until no Candidate Descendants are found in a DSA, as explained infra.

Growing the Candidate Trajectory Tree

Figure 6:
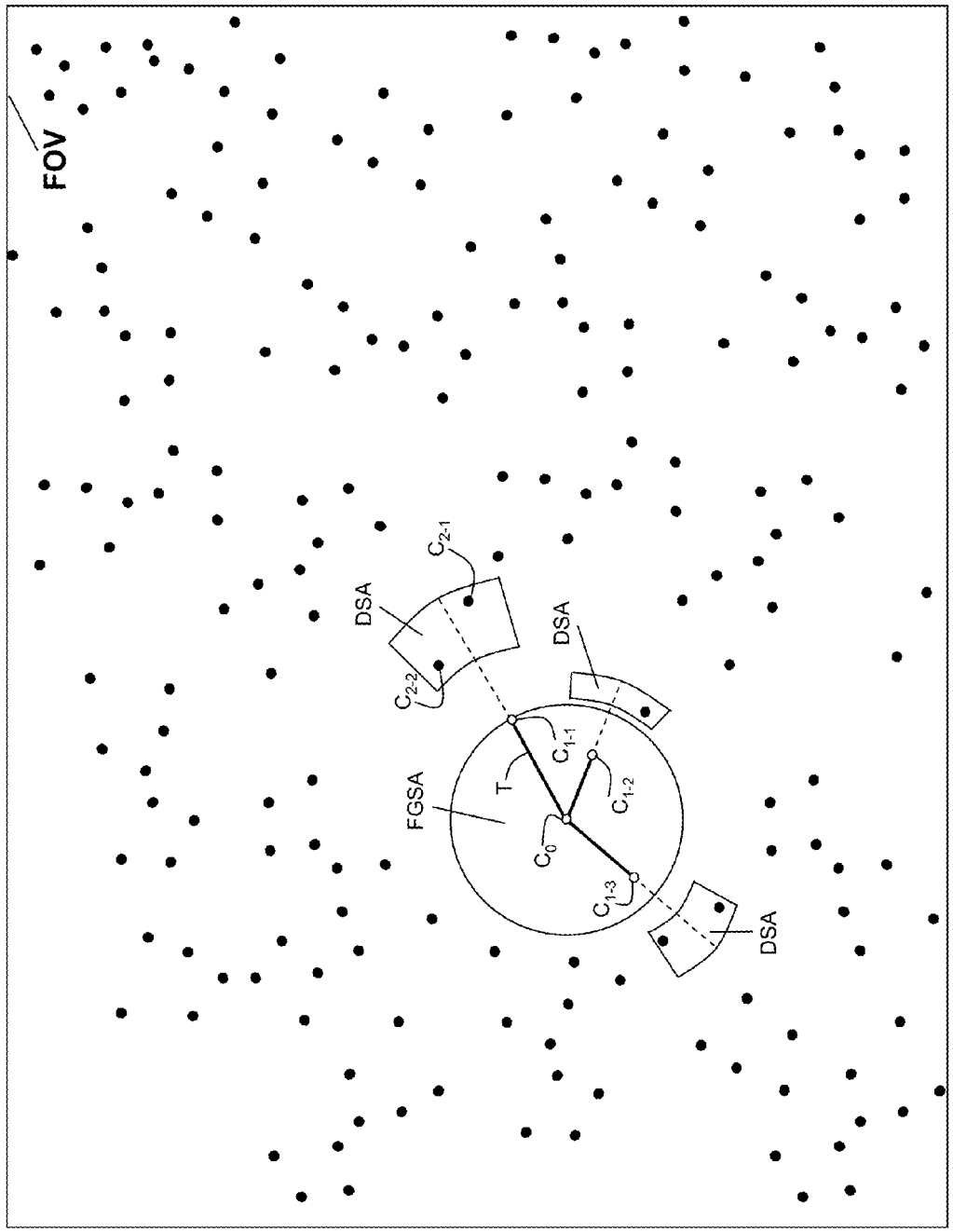
FIG. 6 illustrates analysis of a sample Centroid List in a Field-of-View at time $(t_0+2)$.

FIG. 6 illustrates an example First Generation Search Area FGSA around 0-Generation Centroid $C_0$. $C_0$ was selected from among the centroids on the Centroid List by determining a $t_0$, where the $t_0$ is the earliest-in-time time coordinate from among the time coordinates of the centroids on the Centroid List, and then selecting a centroid on the Centroid List which has a time coordinate equal to the $t_0$, or equivalently, a centroid on the Centroid List which is in the 0-Generation frame. The First Generation Search Area FGSA was defined around $C_0$ based on a given Search Velocity and a time interval. The time interval is determined from the chronological difference between $t_0$ and a ($t_0$+1), where the ($t_0$+1) is a time coordinate in the Centroid Population which immediately chronologically succeeds $t_0$, or equivalently, the chronological difference between the 0-Generation frame and the 1-Generation frame. The time interval may be a constant time interval, when the Centroid Population is generated using a system such as HSPI system 100 with a constant frame rate.

FIG. 6 also illustrates 1-Generation Centroids identified by the FGSA around $C_0$. The 1-Generation Centroids are centroids on the Centroid List which have a location coordinate within the FGSA boundary and which have a time coordinate equal to ($t_0$+1). Equivalently, the 1-Generation Centroids are centroids on the Centroid List which have a location coordinate within the FGSA boundary and which are in the 1-Generation frame. Three 1-Generation Centroids are found within the FGSA at FIG. 6, denoted as $C_{1-1}$, $C_{1-2}$, and $C_{1-3}$. At FIG. 6, the 0-Generation Centroid $C_0$ and the three 1-Generation Centroids are shown as empty circles.

The 0-Generation Centroid $C_0$ and the three 1-Generation Centroids at FIG. 6 establish a Candidate Trajectory Tree. At time ($t_0$+1), the Candidate Trajectory Tree originates at $C_0$ and is comprised of three Candidate Trajectories, and where each the Candidate Trajectories has a Trajectory Centroid Population comprised of $C_0$ and one of the three 1-Generation Centroids: $C_{1-1}$, $C_{1-2}$, and $C_{1-3}$. At FIG. 6, each Candidate Trajectory is indicated by a solid line from $C_0$ to one of the three 1-Generation Centroids. At FIG. 6, each of the three Candidate Trajectories is an Active Candidate Trajectory, because none of the three Candidate Trajectories yet have a Candidate Terminal Centroid.

At FIG. 6, the Candidate Trajectory Tree is grown by pairing each 1-Generation Centroid with the 0-Generation Centroid to from a Descendant Search Area, denoted by DSA at FIG. 6. At FIG. 6, a DSA is generated for each Active Candidate Trajectory, where the DSA is a bounded area based on the location coordinates of one or more centroids in the each Active Candidate Trajectory's Trajectory Centroid Population. Centroids on the Centroid List having a time coordinate of $(t_0+2)$ are then analyzed to determine Candidate Descendants for each Active Candidate Trajectory, where $(t_0+2)$ is a time coordinate in the Centroid Population which immediately chronologically succeeds $(t_0+1)$. Equivalently, centroids on the Centroid List having a time coordinate of $(t_0+2)$ are in the 2-Generation frame. FIG. 6 illustrates centroids on the Centroid List having a time coordinate of $(t_0+2)$ as filled circles. The centroids having a both a time coordinate of $(t_0+2)$ and a location coordinate with a DSA are determined to be Candidate Descendants for the Active Candidate Trajectory on which the DSA is based. For example, at FIG. 6, the DSA enclosing centroids denoted as $C_{2-1}$ and $C_{2-2}$ is based on one or more centroids in the Trajectory Centroid Population of Active Candidate Trajectory T. As a result, the centroids denoted as $C_{2-1}$ and $C_{2-2}$ are Candidate Descendants of the Active Candidate Trajectory T. The remaining Candidate Descendants at FIG. 6 apply to one of the remaining two Active Candidate Trajectories in similar fashion. Note that it is possible (and common for high centroid concentrations) to find more than one centroid in a DSA.

Note that for the purpose of illustration, FIG. 6 includes centroids on the Centroid List over three separate time coordinates. The 0-Generation Centroid $C_0$ has a time coordinate equal to $t_0$, and was selected from among all centroids on the Centroid List having a time coordinate equal to $t_0$. The three 1-Generation Centroids have a time coordinate equal to $(t_0+1)$, and represent all centroids on the Centroid List having a location coordinate within FGSA and a time coordinate of $(t_0+1)$. The remaining centroids illustrated at FIG. 6 as filled circles are all centroids on the Centroid List having a time coordinate equal to $(t_0+2)$.

Note also that within the method, Candidate Descendants are determined from among centroids on the Centroid List having a time coordinate equal to a $t_C$. At FIG. 6, $t_C$ is equal to $(t_0+2)$. To continue growing the Candidate Trajectory Tree through the identification of subsequent Candidate Descendants, the $t_C$ is chronologically advanced according to the time coordinates present in the Centroid Population, as discussed infra. Within the method, $t_C$ serves as a time marker and is always chronologically subsequent to the time coordinate $t_0$ of the 0-Generation Candidate for which the Candidate Trajectory Tree exists. During the Candidate Trajectory Tree growing process, $t_C$ continues to be chronologically advanced until each of the Candidate Trajectories in the Candidate Trajectory Tree terminates.

Having determined Candidate Descendants for the Active Candidate Trajectories of FIG. 6, The Candidate Trajectory Tree is grown to include each of the Candidate Descendants in a separate trajectory. For example, with reference to FIG. 6, the Candidate Trajectory Tree is grown to include Candidate Descendant $C_{2-1}$ by defining a $C_{2-1}$ trajectory having a Trajectory Centroid Population comprised of a) Candidate Trajectory T's Trajectory Centroid Population $C_0$ and $C_{1-1}$ and b) Candidate Descendant $C_{2-1}$. Similarly, the Candidate Trajectory Tree is grown to include Candidate Descendant $C_{2-2}$ by defining a $C_{2-2}$ trajectory having a Trajectory Centroid Population comprised of a) Candidate Trajectory T's Trajectory Centroid Population comprised of $C_0$ and $C_{1-1}$ and b) Candidate Descendant $C_{2-2}$. The $C_{2-1}$ trajectory and the $C_{2-2}$ trajectory are then added to the Candidate Trajectories comprising the Candidate Trajectory Tree, and Candidate Trajectory T is removed from the Candidate Trajectories comprising the Candidate Trajectory Tree. The process is repeated for the remaining Active Candidate Trajectories having one or more Candidate Descendants. This establishes the Candidate Trajectories for the Candidate Trajectory Tree to be analyzed with centroids that immediately chronologically succeed the Candidate Descendants identified, such as $C_{2-1}$ and $C_{2-2}$.

Figure 7:
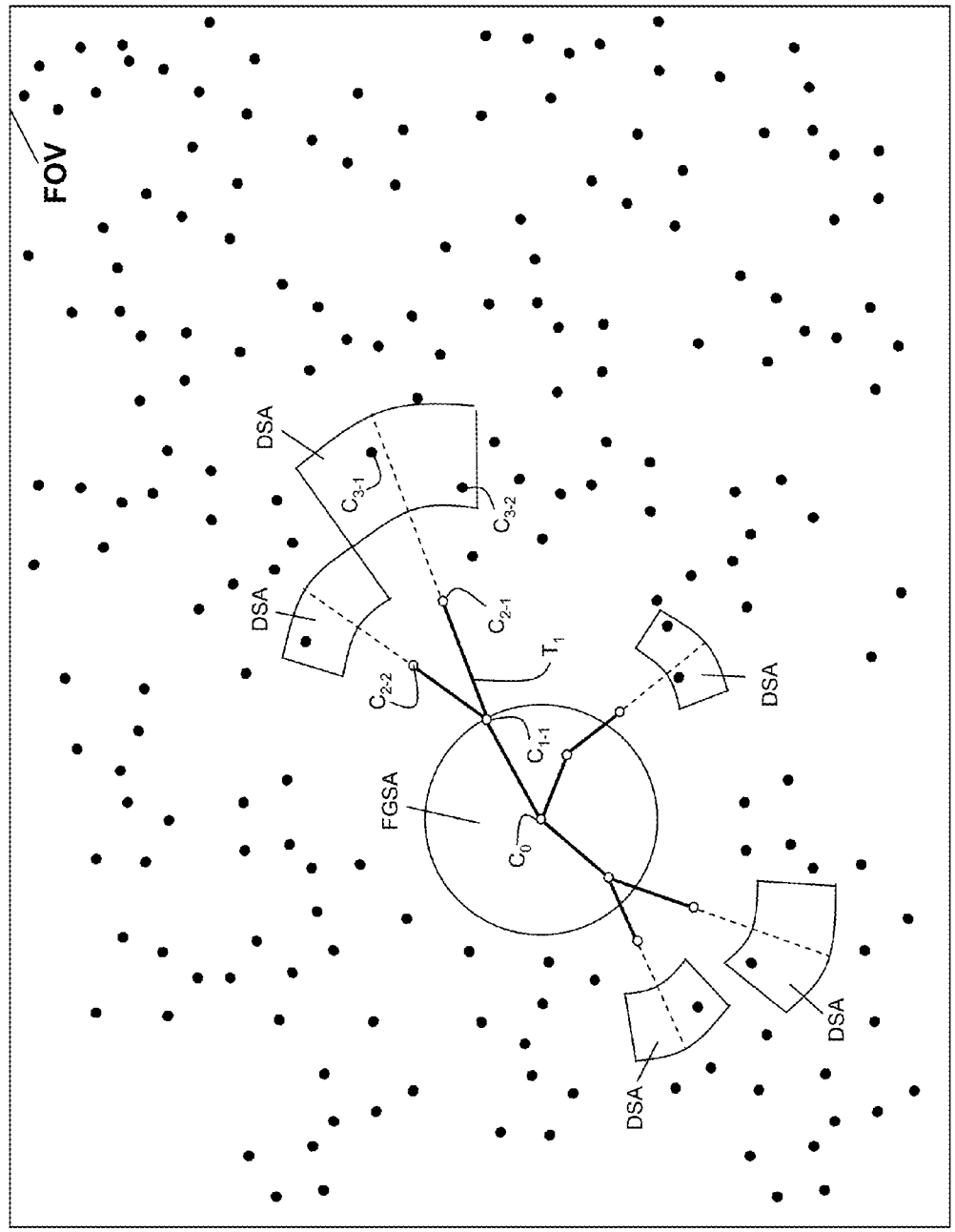
FIG. 7 illustrates analysis of the sample Centroid List in the Field-of-View at time $(t_0+3)$.

The process of growing the Candidate Trajectory Tree of FIG. 6 continues by chronologically advancing $t_C$ from $(t_0+2)$ to $(t_0+3)$, where $(t_0+3)$ is a time coordinate in the Centroid Population which immediately chronologically succeeds $(t_0+2)$, and analyzing centroids found in Descendant Search Areas formed in the next frame, the 3-Generation frame at $(t_0+3)$. FIG. 7 illustrates the next step for $t_C$ equal to $(t_0+3)$. FIG. 7 shows the Candidate Trajectory Tree with Candidate Trajectories that now include all the Candidate descendants identified at $(t_0+2)$. At FIG. 7, the Candidate Trajectories comprising the Candidate Trajectory Tree are shown as solid lines, and the FGSA and centroids $C_0$, $C_{1-1}$, $C_{2-1}$, and $C_{2-2}$ from FIG. 6 are labeled for reference. All centroids having a time coordinate earlier than $t_C$ at FIG. 7 are shown as empty circles, while the remaining centroids illustrated at FIG. 7 as filled circles are all centroids on the Centroid List having a time coordinate equal to $t_C=(t_0+3)$. Following the process described earlier for $t_C=(t_0+2)$, Descendant Search Areas denoted as DSA are generated for each Active Candidate Trajectory at FIG. 7, where the DSA is a bounded area based on the location coordinates of one or more centroids in the each Active Candidate Trajectory's Trajectory Centroid Population. Candidate Descendants are located for each Active Candidate Trajectory centroids by determining the centroids on the Centroid List having a both a time coordinate of $(t_0+3)$ and a location coordinate in a DSA. The centroids thus located are determined to be Candidate Descendants for the Active Candidate Trajectory on which the DSA is based. For example, Centroid $C_{3-1}$ is a Candidate Descendant for Active Candidate Trajectory $T_1$, having a Trajectory Centroid Population of $C_0$, $C_{1-1}$, and $C_{2-1}$. At FIG. 7, additional Candidate Descendants exist for both $T_1$ and the remaining Active Candidate Trajectories on the Candidate Trajectory Tree. Prior to advancing $t_C$ to the next chronological time coordinate, a new trajectory for each Candidate Descendant will be created, added to the Candidate Trajectory Tree as a Candidate Trajectory, and the Active Candidate Trajectories at $t_C=(t_0+3)$ will be removed from the Candidate Trajectory Tree. For example, a Candidate Trajectory will be added having a Trajectory Centroid Population of $C_0$, $C_{1-1}$, $C_{2-1}$, and $C_{3-1}$, and a Candidate Trajectory will be added having a Trajectory Centroid Population of $C_0$, $C_{1-1}$, $C_{2-1}$, and $C_{3-2}$.

The search process for the 0-Generation Centroid $C_0$ continues through chronologically succeeding time coordinates in the Centroid Population until all Candidate Trajectories comprising the Candidate Trajectory Tree reach a Candidate Terminal Centroid. A Candidate Terminal Centroid is the chronologically latest centroid in a Candidate Trajectory, meaning either that no centroids were found in a Descendant Search Area of the Active Candidate Trajectory representing the Candidate Trajectory, or that a predetermined limit on the quantity of centroids in a Trajectory Centroid Population has been exceeded, or that a predetermined limit on the quantity of sequential imaginary centroids has been exceeded, or that there are no centroids in the Centroid List having a time coordinate which immediately chronologically succeeds the $t_C$. Imaginary centroids are discussed infra. Within the method, when a Candidate Trajectory comprising the Candidate Trajectory Tree has a Candidate Terminal Centroid in its Trajectory Centroid Population, the Candidate Trajectory is considered to be terminated.

Figure 8:
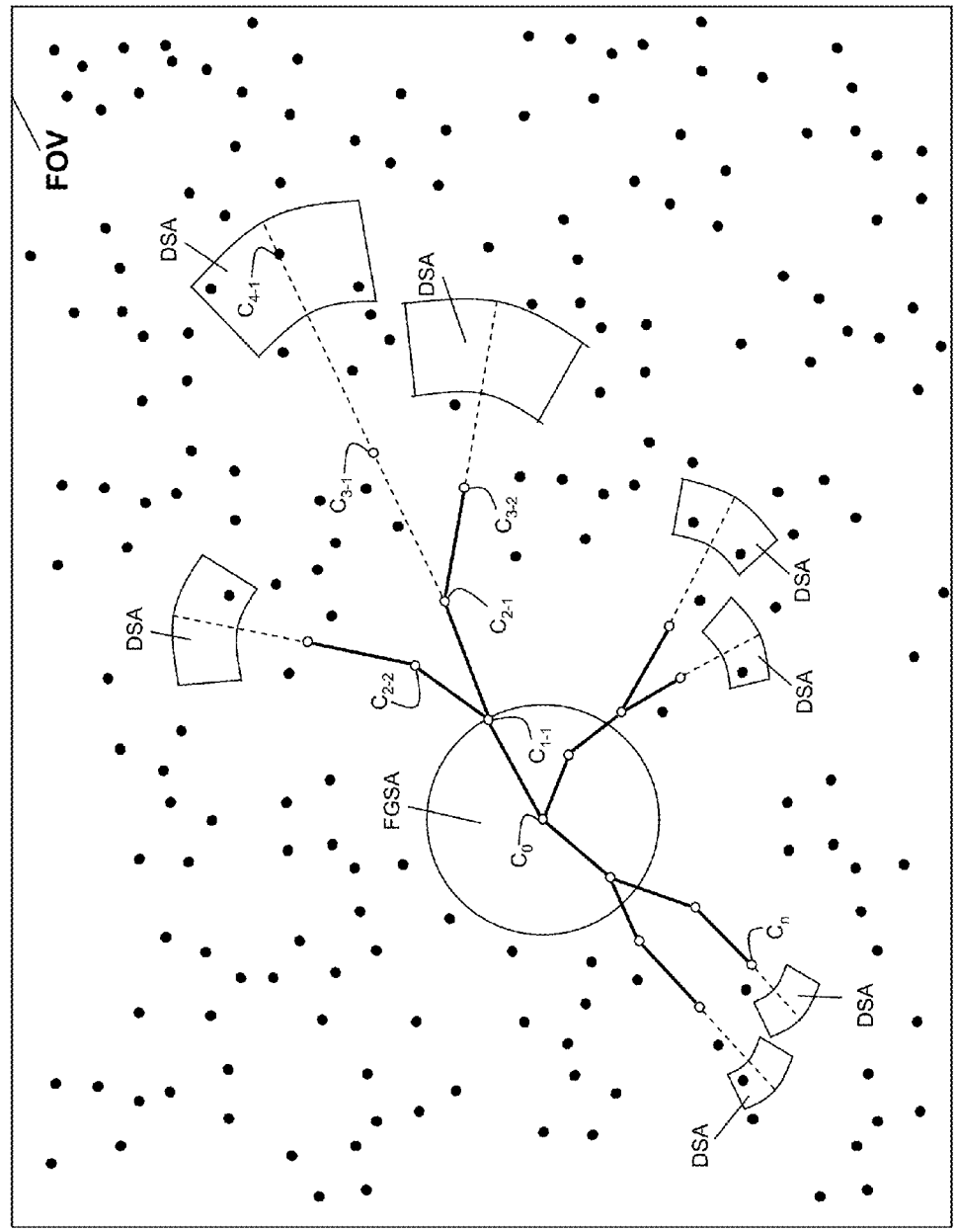
FIG. 8 illustrates analysis of the sample Centroid List in the Field-of-View at time $(t_0+4)$.
Figure 9:
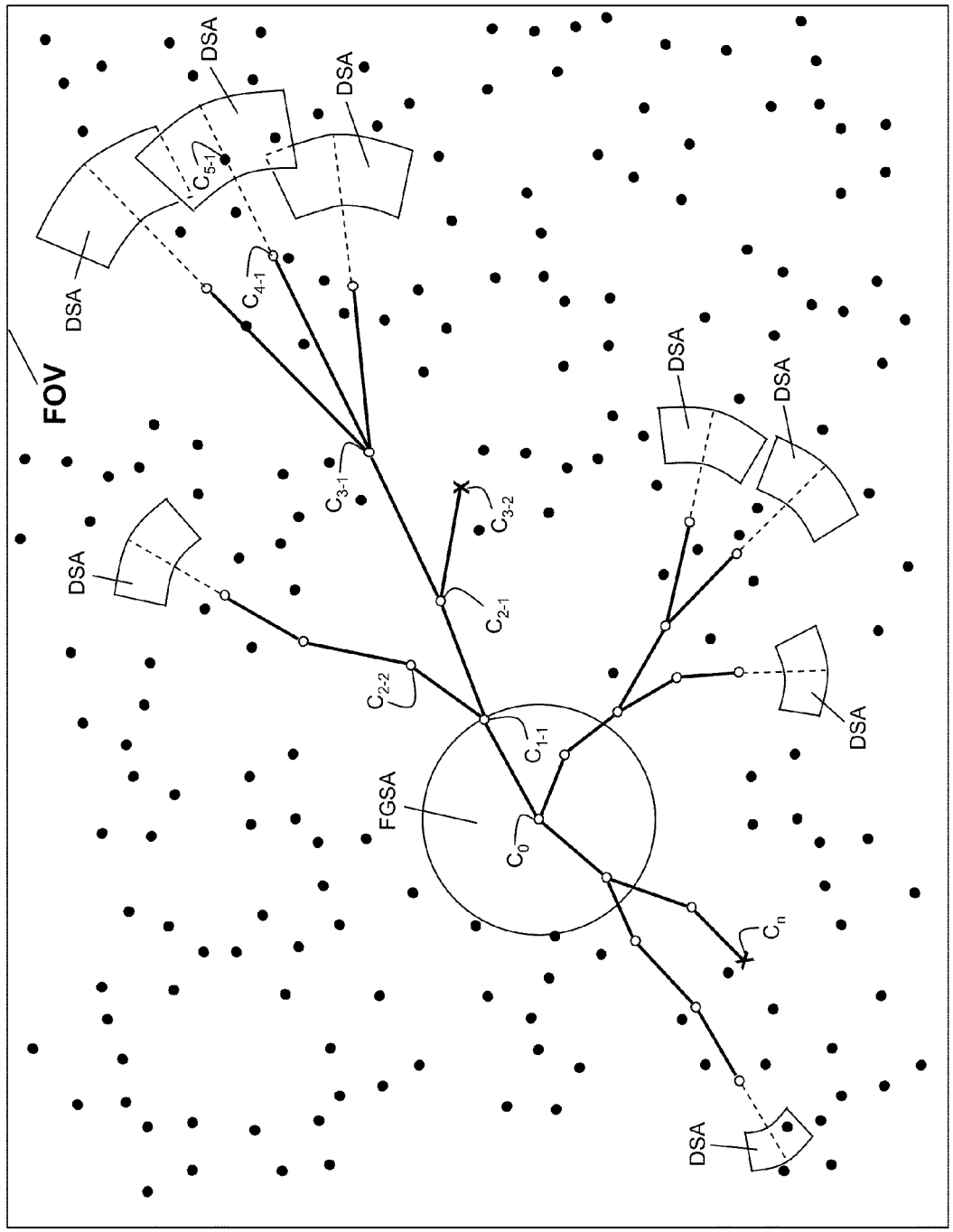
FIG. 9 illustrates analysis of the sample Centroid List in the Field-of-View at time $(t_0+5)$.
Figure 10:
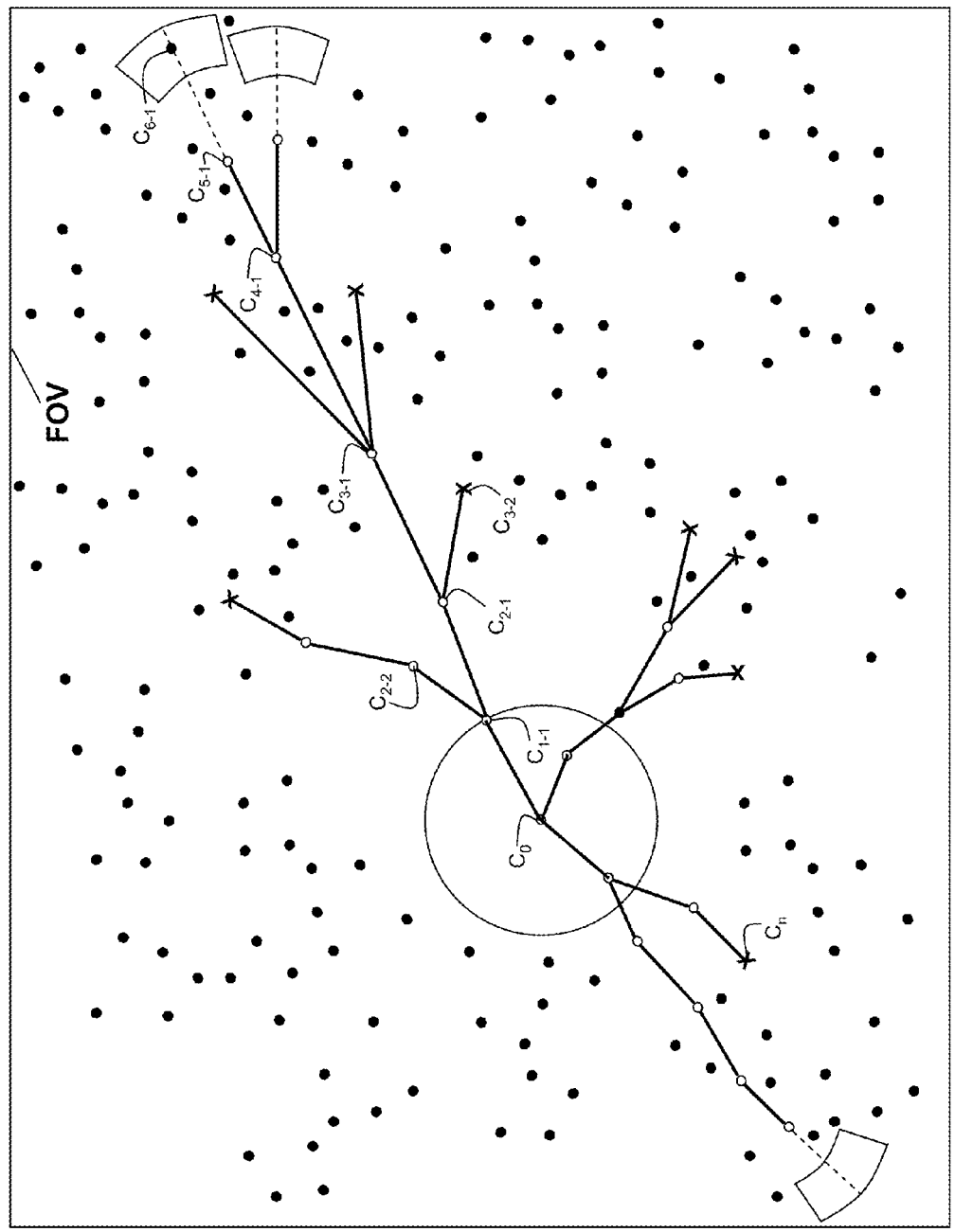
FIG. 10 illustrates analysis of the sample Centroid List in the Field-of-View at time $(t_0+6)$.

After all Candidate Trajectories have been terminated in the Candidate Trajectory Tree, the most probable trajectory to be a real particle trajectory is then determined by identifying the longest (oldest) Candidate Trajectory in the Candidate Trajectory Tree. FIGS. 8, 9, and 10 show the 4-, 5-, and 6-Generation frames at $t_C=(t_0+4)$, $t_C=(t_0+5)$, and $t_C=(t_0+6)$. At FIGS. 8, 9, and 10, the Candidate Trajectories comprising the Candidate Trajectory Tree are shown as solid lines, the FGSA and centroids $C_0$, $C_{1-1}$, $C_{2-1}$, and $C_{3-1}$ are labeled for reference, and all centroids having a time coordinate earlier than the $t_C$ represented are shown as empty circles, while the centroids on the Centroid List having a time coordinate equal to the $t_C$ represented are shown as filled circles. Descendant Search Areas resulting at the $t_C$ represented by the figure are denoted by DSA. Note that at FIG. 8, where $t_C=(t_0+4)$, the Active Candidate Trajectory which includes centroid $C_{3-2}$ in its Trajectory Centroid Population has no centroids in the Centroid List having both a location coordinate within the respective DSA and a time coordinate equal to $t_C=(t_0+4)$. In this example, without the use of imaginary centroids as explained infra, centroid $C_{3-2}$ then becomes a Candidate Terminal Centroid for the Candidate Trajectory in the Candidate Trajectory Tree that the Active Candidate Trajectory represents. The same criteria applies to the centroid denoted as $C_n$.

At FIG. 9, $t_C$ is chronologically advanced to $t_C=(t_0+5)$. Candidate Descendants are evaluated for each Active Candidate Trajectory at $t_C=(t_0+5)$. Because the centroids $C_{3-2}$ and centroid $C_n$ are Candidate Terminal Centroids, the Candidate Trajectories having those respective centroids within their Trajectory Centroid Population have terminated, and those Candidate Trajectories are not Active Candidate Trajectories at FIG. 9, when $t_C=(t_0+5)$.

At FIG. 10, $t_C$ is chronologically advanced to $t_C=(t_0+6)$. Candidate Descendants are evaluated for each Active Candidate Trajectory at $t_C=(t_0+6)$. At $t_C=(t_0+6)$, numerous Candidate Trajectory comprising the Candidate Trajectory Tree have terminated. Candidate Terminal Centroids at FIG. 10 are illustrated as an X. At FIG. 10, centroid $C_{6-1}$ is the only Candidate Descendant for any Active Candidate Trajectory at time $t_C=(t_0+6)$. In this example, centroid $C_{6-1}$ has a time coordinate equal to the chronologically latest time coordinate in the Centroid List, and centroid $C_{6-1}$ becomes a Candidate Terminal Centroid. At $t_C=(t_0+6)$, all Candidate Trajectories comprising the Candidate Trajectory Tree have a Candidate Terminal Centroid and have terminated.

When all Candidate Trajectories have terminated, the Candidate Terminal Centroids within the Trajectory Centroid Populations of the Candidate Trajectories are compared, and the single Candidate Terminal Centroid having a chronologically latest time coordinate from among all Candidate Terminal Centroids is designated as the Realized Terminal Centroid. The Candidate Trajectory having that single Candidate Terminal Centroid in its Trajectory Centroid Population is designated as the Realized Trajectory among the Candidate Trajectories comprising the Candidate Trajectory Tree, and the Realized Trajectory for 0-Generation Centroid $C_0$. The Realized Trajectory thus represents a longest (oldest) Candidate Trajectory in the Candidate Trajectory Tree, and the Realized Trajectory becomes the most probable trajectory. In this example, the Realized Trajectory for the 0-Generation Centroid $C_0$ is the Candidate Trajectory having centroids $C_0$, $C_1$, $C_{2-1}$, $C_{3-1}$, $C_{4-1}$, $C_{5-1}$, and $C_{6-1}$ in its Trajectory Centroid Population, where $C_0$ is the 0-Generation Centroid and $C_{6-1}$ is the Realized Terminal Centroid.

The centroids making up the Realized Trajectory are then removed from the Centroid List, and the process repeats for a next 0-Generation Candidate having a time coordinate equal to $t_0$, where the $t_0$ is the earliest-in-time time coordinate from among the time coordinates of the centroids remaining on the Centroid List. The Candidate Trajectory Tree growing process is repeated for that next 0-Generation Candidate and a Realized Trajectory is determined, and the centroids in the Trajectory Centroid Population of the Realized Trajectory for that next 0-Generation Candidate are removed from the Centroid List, and so on, until each centroid remaining on the Centroid List is analyzed as a 0-Generation Candidate for the given Search Velocity, using the centroids remaining on the Centroid List and having chronologically subsequent time coordinates to the 0-Generation Candidate under evaluation.

It can be appreciated that one of the novel aspects of the method is the removal of Realized Trajectories, and the decrease in the quantity of centroids on the Centroid List as the method progresses toward evaluation of all centroids as 0-Generation Candidates. Removing those centroids in the Trajectory Centroid Population of each Realized Trajectory as that Realized Trajectory is established greatly reduces required processing steps.

When all centroids on the Centroid List have been analyzed as 0-Generation Candidates, the Search Velocity is increased to a next Search Velocity, and the process is repeated using the next Search Velocity as the given Search Velocity. This process repeats until either there are no remaining centroids from the Centroid Population remaining on the Centroid List, or until the process has been conducted for a maximum Search Velocity.

It can be appreciated that another of the novel aspects of the method is the progressive use of an increasing Search Velocity, which limits recognition and development of Realized Trajectories to those falling within the constraints of the Search Velocity being used and a time interval between a 0-Generation Candidate and an immediately chronologically succeeding centroid in the Centroid List. The method does not process trajectories falling outside those constraints until the Search Velocity is increased, thereby greatly reducing required processing steps at each Search Velocity.

In the foregoing, the 6-Generation frame illustrated at FIG. 10 is the last frame in the Centroid Population, however this is not limiting. In typical applications, the method has identified trajectories over 1000 frames long. It can also be recognized that the centroids illustrated at FIGS. 6 through 10 are for illustration purposes only, and that a typical Centroid Population may be comprised, for example, of thousands or millions of frames with each frame comprised of tens to thousands of centroids.

Figure 11:
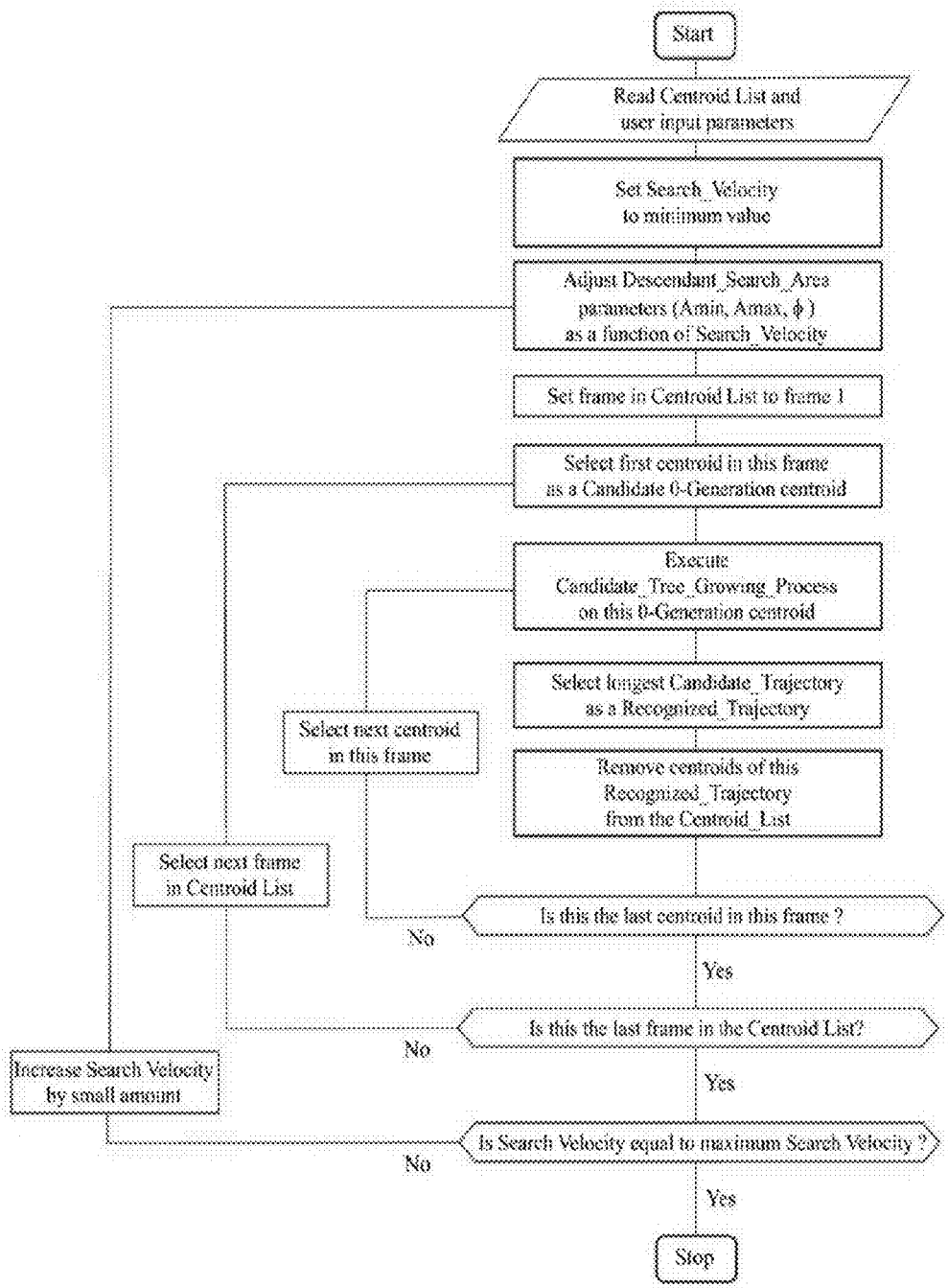
FIG. 11 illustrates a basic flowchart describing the method.

FIG. 11 illustrates a flow chart of the method as described herein, indicating the evaluation of all centroids in chronological order as a 0-Generation Candidate through the Candidate Trajectory Tree growing process, removal of centroids in the Trajectory Centroid Population of each Realized Trajectory, and progressively increasing the Search Velocity in order to evaluate Realized Trajectories with minimized processing steps.

Use of Imaginary Centroids

A feature that may be helpful for accurate trajectory recognition in high concentration particle flows is the application of imaginary centroids. When no Candidate Descendants are located within the Descendant Search Area of an Active Candidate Trajectory, an attempt is made to continue the Candidate Trajectory by adding an imaginary centroid. Often in videos of real particle flow fields, a particle image along a trajectory disappears for one or more frames. This could be caused by another particle in front of the particle or other particles are blocking illumination of the particle.

The imaginary centroid is added within the Descendant Search Area, and the imaginary centroid is treated as a Candidate Descendant for subsequent analysis of the next chronological frame. This process may be repeated for additional imaginary centroids until the quantity of chronologically sequential imaginary centroids exceeds a predetermined limit.

Imaginary Centroids

The method allows the trajectory centroid population of candidate trajectories to include imaginary centroids. The use of these imaginary centroids significantly improves trajectory recognition in high particle concentration flows.

Figure 12:
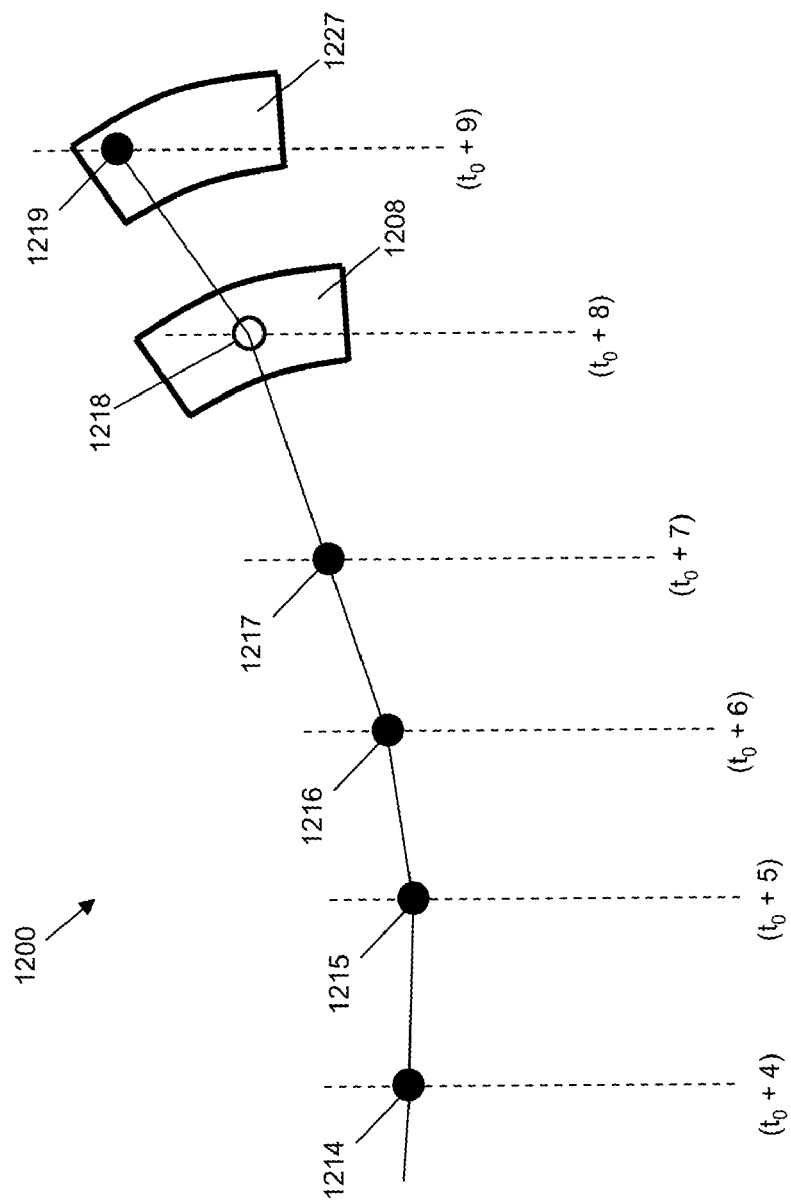
FIG. 12 illustrates a trajectory using imaginary centroids.

The addition of an imaginary centroid in illustrated at FIG. 12. FIG. 12 illustrates a section of a Candidate Trajectory having a trajectory centroid population which includes centroids 1214 through 1219, established in a chronological evaluation of a Centroid List from time $t_C=(t_0+4)$ to time $t_C=(t_0+9)$, as indicated by the time axes. Centroids 1214 through 1217 are real centroids identified as Candidate Descendants during evaluations conducted at $(t_0+4)$ through $(t_0+7)$ respectively. At time $(t_0+8)$, Descendant Search Area 1208 is established. In the embodiment illustrated, centroid 1217 is a first centroid and centroid 1216 is a second centroid for the generation of Descendant Search Area 1208. No real centroids in the Centroid List having a location coordinate within Descendant Search Area 1208 and having a time coordinate of $(t_0+8)$ are identified. Within this method, when no real centroids in the Centroid List are identified within a Descendant Search Area as Candidate Descendants, an imaginary centroid having location coordinates within the Descendant Search Area is generated and assigned a time coordinate which immediately chronologically succeeds the latest time coordinate in the Trajectory Centroid Population of the Active Candidate Trajectory on which Descendant Search Area is based. In the embodiment illustrated at FIG. 12, the imaginary centroid 1218 is located on the descendant axis at a location equidistant from the first circular arc and the second circular arc comprising the Descendant Search Area and assigned a time coordinate of $(t_0+8)$. The imaginary centroid 1218 having location and time coordinates as described is treated as a Candidate Descendant and utilized during analysis at the next chronological step, here $(t_0+9)$, where Descendant Search Area 1227 is established using imaginary centroid 1218 as the first centroid and real centroid 1217 as the second centroid, in order to recognize real centroid 1219 as a Candidate Descendant at time $(t_0+9)$.

Use of imaginary centroids in this manner allows the method to continue Candidate Trajectories when a centroid may not be present because of one or more factors, including overlap of particle images, variations in illumination, pixel jitter, noise, or other reasons, and significantly improves trajectory recognition in high particle concentration flows.

Note that imaginary centroid 1218 becomes a member of a Candidate Trajectory's Trajectory Centroid Population at time $(t_0+8)$ and during analysis at subsequent time coordinates, but that imaginary centroid 1218 does not become a member of the Centroid Population or the Centroid List. As a result, the method described does not utilize generated imaginary centroids as 0-Generation Candidates. Similarly, the method does not recognize generated imaginary centroids such as imaginary centroid 1218 as a Candidate Descendant for any trajectories except the single Active Candidate Trajectory under evaluation while growing the Candidate Trajectory Tree.

The number of imaginary centroids which may occur in chronological succession in a Trajectory Centroid Population may be limited by a predetermined limit on sequential imaginary centroids. If no centroids are found in the Descendant Search Area of an Active Candidate Trajectory, and if the predetermined limit on sequential imaginary centroids will be exceeded by an additional imaginary centroid, then the chronologically latest real centroid in the Trajectory Centroid Population of the Active Candidate Trajectory is designated as a Candidate Terminal Centroid, and the Candidate Trajectory terminates.

For some flow fields, such as flow fields with lower particle concentrations, it is useful to allow two or more consecutive imaginary centroids, so that an imaginary centroid would also be created in search area 1227 if no real centroid on the Centroid List were found in search area 1227 at time $(t_0+9)$. However, allowing a second consecutive imaginary centroid may increase computation time unacceptably for high concentration flow fields.

Varying First Generation Search Areas for Each Pass through the Centroid List

An important feature of this method is that it searches for trajectories in a Centroid List with a wide range of sizes of First Generation Search Areas during the numerous passes through the Centroid List. The search starts by passing through the Centroid List using a minimum Search Velocity and corresponding minimum First Generation Search Area size. The minimum Search Velocity may be chosen to be slightly slower than the slowest particle velocity expected in a particle flow field. With each new pass through the Centroid List, the Search Velocity may be increased slightly, thereby increasing the resulting First Generation Search Area slightly. The passes through the Centroid List continue until the Search Velocity exceeds a maximum Search Velocity. The maximum Search Velocity may be the fastest particle velocity expected in a particle flow field.

This method of making numerous passes through the Centroid List with increasing Search Velocities (and corresponding First Generation Search Area sizes) greatly improves the accuracy and speed of trajectory recognition.

One reason that making multiple passes through the Centroid List improves trajectory recognition is that starting with smaller Search Velocities detects the slowest, least accelerating particles first, and such trajectories produce the highest local concentration of particle images/centroids. The slowest velocities also produce the shortest trajectories, so the chance of crossing other trajectories is lower than the longer trajectories of faster particles. As a result, starting with minimum Search Velocities initially removes areas of peak particle concentration that tend to be more isolated from other trajectories. Removing local areas of peak particle concentration first greatly reduces correspondence ambiguities and computational complexity.

Each time the Search Velocity is increased, trajectories of slightly faster velocities are recognized and removed from further consideration. So this approach of varying the size of search areas from minimum to maximum isolates, recognizes, and removes the most difficult to recognize trajectories first, thereby greatly reducing computation complexity and computation time required.

The Search Velocity may be gradually increased until it reaches the maximum particle velocity expected to occur in a flow field. If the minimum and maximum particle velocities are not known, the Search Velocity can be varied from near zero until the diameter of the First Generation Search Area approaches the largest dimension of the field-of-view (FOV).

The feature of varying the Search Velocity and First Generation Search Area from a small value to a maximum value is a key feature of the method.

Use of Dimensionless Parameters

In some embodiments, such as Descendant Search Area 427 at FIG. 4A, the Descendant Search Area is defined by a first circular arc, a second circular arc, a first line segment, and second line segment. To express the angular boundaries of the Descendant Search Area in terms of a dimensionless flow parameter, limits on acceleration forming the angular boundaries such as maximum angle 414 at FIG. 4A may be expressed in terms of an Angular Acceleration Number $\phi$. In an embodiment, $\phi$ may vary from 0 to 1, where a value of 0 corresponds to 0 degrees and a value of 1 corresponds to 180 degrees ($\pi$ radians). As $\phi$ goes to 0, the area of the Descendant Search Area goes to 0. As $\phi$ goes to 1, the Descendant Search Area becomes an area between two concentric rings with an inner boundary at the minimum radius $R_{MIN}$ and an outer boundary at the maximum radius $R_{MAX}$.

In one embodiment, the parameters $R_{MIN}$ and $R_{MAX}$ may be expressed in terms of a dimensionless flow dynamic parameter. A minimum acceleration number, $A_{MIN}$, may describe $R_{MIN}$ and a maximum acceleration number, $A_{MAX}$, may describe $R_{MAX}$, using the relationship:

$$R_{MIN}=D_0(2-A_{MIN}) \quad (1)$$

$$R_{MAX}=D_0(2+A_{MAX}) \quad (2)$$

where $D_0$ is the displacement between the first centroid location coordinates and the second centroid location coordinates, where the first centroid and the second centroid are as previously defined.

When $R_{MIN}$ and $R_{MAX}$ are defined according to equations (1) and (2), when $A_{MIN}$ and $A_{MAX}$ approach 0, the radial width of the Descendant Search Area goes to 0, so the area of the Descendant Search Area approaches zero. When $A_{MIN}$ and $A_{MAX}$ go to 1, the largest necessary Descendant Search Area is created. In this case the inner boundary defined by $R_{MIN}$ is at the first centroid. This inner boundary would detect a particle that decelerated to a particle velocity near zero between chronologically adjacent frames. The far boundary, defined by $R_{MAX}$, would cover a particle that accelerated to double its velocity between the chronologically succeeding frames. A value of 1 for $A_{MAX}$ is typically sufficient for most cases when a camera frame rate is set high enough to resolve such high accelerations, and for many cases an assumption can be made that $A_{MIN}=A_{MAX}=1$.

To summarize the dimensionless Acceleration numbers when operating with equations (1) and (2):

when $A_{MIN} \to 0$ and $A_{MAX} \to 0$, the Descendant Search Area goes to zero;

when $A_{MIN} \to 1$ and $A_{MAX} \to 1$, the Descendant Search Area goes to it's maximum size to cover the widest range of accelerations;

$A_{MIN}$ and $A_{MAX}$ may be set closer to 0 for flows expected to have little or no acceleration;

$A_{MIN}$ and $A_{MAX}$ may be set closer to 1 for flows expected to have high accelerations.

Varying Descendant Search Area for Each Pass through the Centroid List

Another feature of the method is that in certain embodiments the size of the Descendant Search Area may vary for each pass through the Centroid List. As discussed, the First Generation Search Area starts with the smallest areas and gradually increases for each pass through the Centroid List. The Descendant Search Area, however, may start with a maximum size and gradually decreases for each pass through the Centroid List, until the Descendant Search Area reaches a minimum size.

The size of the Descendant Search Area may be decreased in a manner such that the area of the Descendant Search Area decreases as the Search Velocity increases. The size of the Descendant Search Area may be decreased by decreasing the values of the dimensionless acceleration parameters $A_{MIN}$, $A_{MAX}$, and $\phi$. The area of the Descendant Search Area may be decreased with increasing Search Velocity to compensate for the effect of uncertainty in the measurement of centroid location. The centroid location may not be detected with 100% accuracy for a number of reasons, including finite sensor pixel resolution, the non-spherical shape and rotation of non-spherical particles, and varying light scattering properties of particles.

Figure 13:
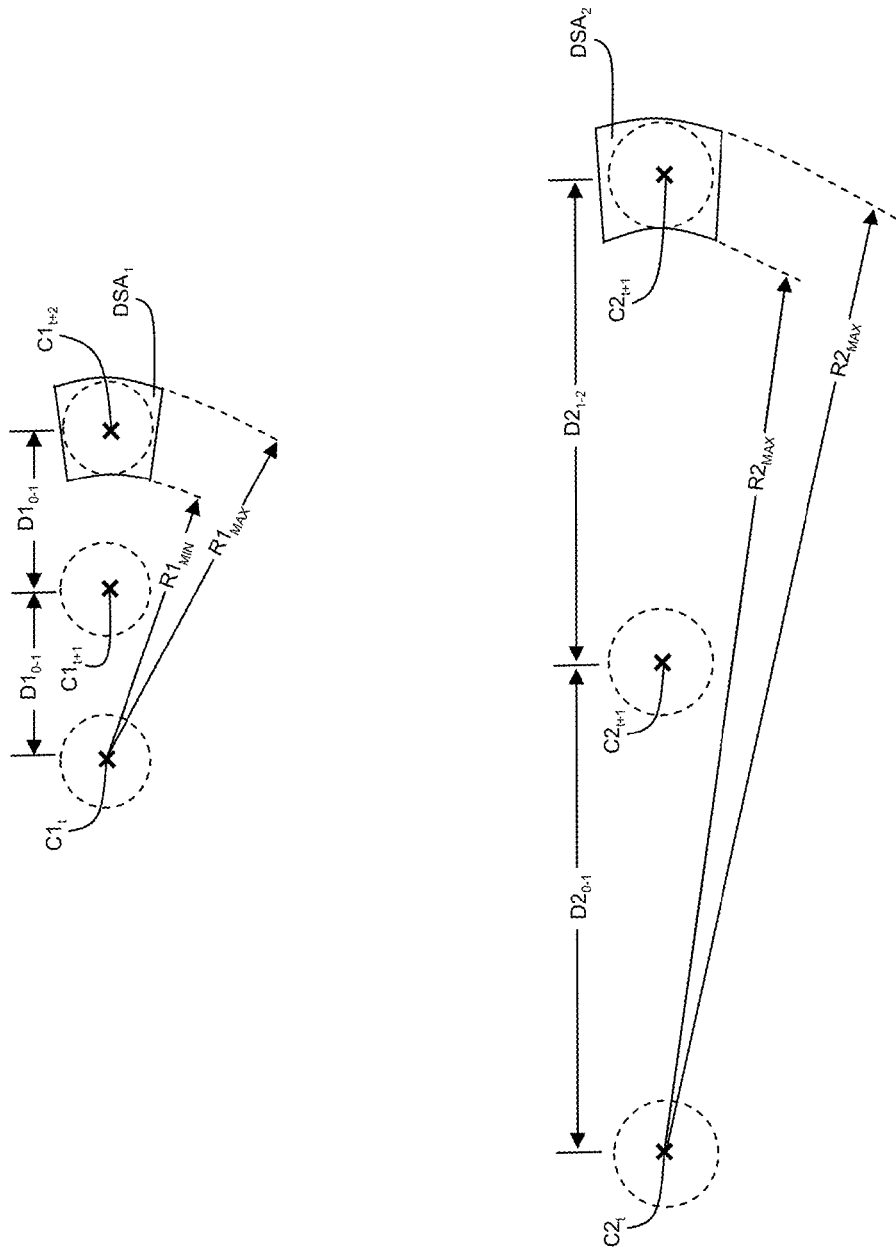
FIG. 13 illustrates Descendant Search Areas varying with the velocity of a trajectory.

To illustrate this concept, the FIG. 13 shows trajectories established by centroids C1 and C2 between a time t and a time (t+2), where the velocity of the C1 trajectory is less than the velocity of the C2 trajectory. The dotted circle around the C1 and C2 positions represents uncertainty in the location of the centroid representing the particles. The uncertainty in location of particle centroids does not depend on particle velocity, so it is the same for all particle centroids.

To account for centroid uncertainty, the size of the Descendant Search Area relative to the distance between centroids C1 and C2 at times t and (t+1) may be larger for slower particles and smaller for faster moving particles; i.e., the relative size of the Descendant Search Area may decrease with increasing velocity.

Recall that in one embodiment the location and size of the Descendant Search Area is proportional to the distance between centroids at time t and time (t+1), shown in FIG. 13 as $D1_{0-1}$ and $D2_{0-1}$. As a result, in this embodiment the actual area enclosed within the Descendant Search Area for the faster C2 trajectory would be much larger than the $DSA_2$ shown were it not reduced in size with increasing velocity. Within the method, making the size of the Descendant Search Area inversely proportional to the Search Velocity may improve the accuracy of trajectory recognition. In an embodiment where the Descendant Search Axis is an area defined by a first centroid and a second centroid and bounded by a first circular arc, a second circular arc, a first line segment, and a second line segment, this may be accomplished by defining a range of maximum acceleration and a range of angular acceleration, and determining the maximum radius, the minimum radius, and the tangential acceleration as a function of the Search Velocity according to:

$$\beta=(V\_Search-V\_Min)/(V\_Max-V\_Min)$$

$$R_{MAX}=D_0[2+A_{MAX\_START}+(A_{MAX\_START}-A_{MAX\_END})\beta^{(V\_Min-V\_Search)}],$$

$$R_{MIN}=D_0[2-A_{MAX\_START}-(A_{MAX\_START}-A_{MAX\_END})\beta^{(V\_Min-V\_Search)}],$$

$$\phi_{MAX}=\phi_{END}+[\phi_{START}-\phi_{END}\beta^{(V\_Min-V\_Search)}]$$

where

V_Search is the Search Velocity,

V_Min is the minimum search velocity,

V_Max is the maximum search velocity, $A_{MAX\_START}$ is a first maximum acceleration, where $0 \leq A_{MAX\_START} \leq 1$, $A_{MAX\_END}$ is a second maximum acceleration, where $0 \leq A_{MAX\_END} \leq 1$, and where $A_{MAX\_START} \leq A_{MAX\_END}$, $\phi_{START}$ is a first angular acceleration, $\phi_{END}$ is a second angular acceleration, where $\phi_{START} \leq \phi_{END}$, $R_{MAX}$ is the maximum radius, $R_{MIN}$ is the minimum radius and, $\phi_{MAX}$ is the tangential acceleration.

Limiting the Length of Candidate Trajectories

Another feature of the method which may be utilized to decrease processing time is placing limits on the length of Candidate Trajectories using a maximum centroid count. This stops extending a Candidate Trajectory after it is longer than probable in a given particle flow field.

When a centroid population represents a particle flow field, the number of centroids in a Candidate Trajectory per unit length is proportional to the particle velocity averaged along the trajectory. As a result, slower particles may create a trajectory across the field-of-view with more centroids than a faster moving particle. This is true for most flow fields that do not have complete swirls or recirculations. Within the method, the search process can be stopped when the Candidate Trajectory of a particle grows longer than a certain number of centroids and exceeds the maximum centroid count.

Requiring a Realized Trajectory to have at least a minimum number of centroids using a minimum centroid count may also reduce the formation of erroneous Realized Trajectories. In an embodiment, if a Realized Trajectory is formed with less than a certain number of centroids, it is discarded.

In an embodiment, the following equations may be used to set boundaries on the maximum centroid count of Candidate Trajectories $L_{MAX}$, and the minimum centroid count of Realized Trajectories $L_{MIN}$:

$$\beta = (V\_Search - V\_Min)/(V\_Max - V\_Min);$$

$$L_{MIN} = L_{MIN\_START} + (L_{MIN\_END} - L_{MIN\_START})\beta;$$

$$L_{MAX} = L_{MAX\_START} + (L_{MAX\_END} - L_{MAX\_START})\beta;$$

where,

V_Search is the Search Velocity,

V_Min is the minimum search velocity,

V_Max is the maximum search velocity, $L_{MIN\_START}$ is a first minimum length of a Realized Trajectory when the minimum Search Velocity is used, $L_{MIN\_END}$ is a second minimum length of a Realized Trajectory when the maximum Search Velocity is used, where $L_{MIN\_END} > L_{MIN\_START}$, $L_{MAX\_START}$ is a first maximum length of a Candidate Trajectory when the minimum Search Velocity is used, $L_{MAX\_END}$ is a second maximum length of a Candidate Trajectory when the maximum Search Velocity is used, where $L_{MAX\_END} > L_{MAX\_START}$.

The "start" and "end" subscripts represent the start and end of the process of varying the Search Velocity for incremental passes through the centroid list. The start and end values are exogenous user input parameters.

The method disclosed herein thus addresses inherent disadvantages in existing methods of particle trajectory recognition by utilizing priori knowledge of particle flow behavior while limiting the size, location, and shape of search areas in successive frames based on applying limits to particle velocity and acceleration, thereby greatly reducing the difficulty and computational requirements of particle trajectory recognition by initially recognizing the most problematic trajectories using uniquely defined search areas that are highly efficient at detecting such trajectories. The approach of varying search areas based on limiting particle flow parameters is combined with other techniques, such as the use of imaginary images to compensate for lost images. The disclosure thus provides a highly efficient and accurate method for numerous real particle flow fields of research and industrial importance.

Having described the basic concept of the invention, it will be apparent to those skilled in the art that the foregoing detailed disclosure is intended to be presented by way of example only, and is not limiting. Various alterations, improvements, and modifications are intended to be suggested and are within the scope and spirit of the present invention. Additionally, the recited order of elements or sequences, or the use of numbers, letters, or other designations therefore, is not intended to limit the claimed processes to any order except as may be specified in the claims. Accordingly, the invention is limited only by the following claims and equivalents thereto.

All publications and patent documents cited in this application are incorporated by reference in their entirety for purposes to the same extent as it each individual publication or patent document were so individually denoted.

What is claimed is:

1. A method of particle trajectory recognition for a Centroid Population comprising:

obtaining the Centroid Population, where the Centroid Population is comprised of a plurality of centroids and where each centroid in the plurality of centroids has an (x, y, t) coordinate, where x and y are location coordinates that define the location of the centroid with respect to a fixed two-dimensional coordinate system, and where t is a time coordinate indicating a time with respect to a fixed time reference at which the each centroid is located at the x and y location coordinates, where t is a member of a finite set of time coordinates, and where each element in the finite set of time coordinates describes the time coordinate of at least one centroid;

establishing a minimum search velocity and a maximum search velocity, where the maximum search velocity is greater than the minimum search velocity, and generating a finite set of velocities including the minimum velocity and the maximum velocity, where every other element in the finite set of velocities is greater than the minimum search velocity and less than the maximum search velocity;

establishing a Centroid List, where the Centroid List is comprised of all centroids in the Centroid Population;

setting a Search Velocity equal to the minimum search velocity; and realizing centroid trajectories and reducing the number of centroids on the Centroid List by establishing Candidate Trajectories for the Search Velocity by, analyzing centroids on the Centroid List in chronological order based on the time coordinates of the centroids on the Centroid List, and reducing the Centroid List by, determining a $t_0$, where the $t_0$ is the earliest-in-time time coordinate from among the time coordinates of the centroids on the Centroid List and analyzing each centroid on the Centroid List having a time coordinate equal to the $t_0$ by, defining a First Generation Search Area around a 0-Generation Candidate, where the 0-Generation Candidate is a centroid on the Centroid List having a time coordinate equal to the $t_0$, and identifying 1-Generation Centroids, and if one or more 1-Generation Centroids are identified, defining the 0-Generation Candidate as a 0-Generation Centroid, and defining a $(t_0+1)$, where the $(t_0+1)$ is a time coordinate in the Centroid Population that immediately chronologically succeeds the $t_0$, and defining one or more Candidate Trajectories, where each Candidate Trajectory's Trajectory Centroid Population is comprised of the 0-Generation Centroid and one of the one or more 1-Generation Centroids, such that a Candidate Trajectory Tree is established for the 0-Generation Centroid, and growing the Candidate Trajectory Tree and defining a Realized Trajectory for the 0-Generation Centroid by, analyzing at a time $t_C$, where the time $t_C$ is a time coordinate, in chronological order, beginning with the time $t_C$ equal to $(t_0+2)$, where the $(t_0+2)$ is a time coordinate in the Centroid Population that immediately chronologically succeeds the $(t_0+1)$, until each of the one or more Candidate Trajectories terminates by, identifying Active Candidate Trajectories at the time $t_C$, where an Active Candidate Trajectory is one of the one or more Candidate Trajectories, and where the Trajectory Centroid Population for the one of the one or more Candidate Trajectories does not include a Candidate Terminal Centroid, and evaluating each Active Candidate Trajectory by, defining a Descendant Search Area for the each Active Candidate Trajectory at the time $t_C$ and identifying Candidate Descendants for the each Active Candidate Trajectory or the Candidate Terminal Centroid for the one of the one or more Candidate Trajectories, defining, if one or more Candidate Descendants are identified for the each Active Candidate Trajectory, a time $t_C$ trajectory for each Candidate Descendant, where the time $t_C$ trajectory for the each Candidate Descendant has a time $t_C$ Trajectory Centroid Population consisting of the each Candidate Descendant and the Trajectory Centroid Population of the each Active Candidate Trajectory, such that one or more time $t_C$ trajectories are defined, adding the one or more time $t_C$ trajectories to the one or more Candidate Trajectories, and eliminating the each Active Candidate Trajectory from the one or more Candidate Trajectories, thereby evaluating the each Active Candidate Trajectory, increasing the time $t_C$ by an amount equal to the constant time interval and repeating the analyzing at a time $t_C$ step, until each of the one or more Candidate Trajectories terminates, thereby analyzing at the time $t_C$, where the time $t_C$ is a time coordinate, in chronological order, until each of the one or more Candidate Trajectories terminates, comparing the Candidate Terminal Centroids of the one or more Candidate Trajectories and identifying a Realized Terminal Centroid, where the Realized Terminal Centroid is one of the Candidate Terminal Centroids of the one or more Candidate Trajectories having a chronologically latest time coordinate, and defining the Realized Trajectory for the 0-Generation Centroid based on the Realized Terminal Centroid, where a Trajectory Centroid Population of the Realized Trajectory is equivalent to a Trajectory Centroid Population comprised of the Realized Terminal Centroid, thereby growing the Candidate Trajectory Tree and defining the Realized Trajectory for the 0-Generation Centroid, eliminating the Trajectory Centroid Population of the Realized Trajectory from the Centroid List, thereby reducing the Centroid List, selecting a new 0-Generation candidate, where the new 0-Generation candidate is a centroid on the Centroid List having a time coordinate equal to the $t_0$, and repeating the defining a First Generation Search Area around a 0-Generation Candidate step using the new 0-Generation Candidate as the 0-Generation Candidate, until all centroids on the Centroid List having a time coordinate equal to the $t_0$ have been analyzed, thereby determining the $t_0$ and analyzing each centroid on the Centroid List having a time coordinate equal to the $t_0$ repeating the analyzing centroids on the Centroid List in chronological order based on the time coordinates of the centroids in the Centroid List step until all centroids on the Centroid List have been analyzed, thereby analyzing centroids on the Centroid List in chronological order based on the time coordinates of the centroids on the Centroid List, and reducing the Centroid List, determining a next velocity from the finite set of velocities, where the next velocity is greater than the Search Velocity, and where the next velocity is less than all other members of the finite set of velocities that are greater than the Search Velocity, and setting the Search Velocity equal to the next velocity, and repeating the realizing centroid trajectories and reducing the number of centroids on the Centroid List by establishing Candidate Trajectories for the Search Velocity step until all members of the finite set of search velocities have been utilized as the Search Velocity, realizing centroid trajectories and reducing the number of centroids on the Centroid List by establishing Candidate Trajectories for the Search Velocity, thereby performing the method of particle trajectory recognition for the Centroid Population.

2. The method of claim 1 where obtaining the Centroid Population is accomplished by, generating a plurality of frames depicting imaged particles in a flow field over a time period using an equivalent field of view in each frame and a constant time interval between each frame, such that an imaged particle depicted in any frame may be located with respect to the field of view and such that each frame in the plurality of frames has a unique time identifier, and processing the plurality of frames depicting imaged particles to create the Centroid Population, where each centroid in the Centroid Population corresponds to an imaged particle on a single frame in the plurality of frames, such that the each centroid has an (x, y, t) coordinate where x and y are location coordinates that define the location of the imaged particle on the single frame with reference to the field of view, and t is a time coordinate corresponding to the unique time identifier of the single frame in the plurality of frames.

3. A digital computer system programmed to perform the method of claim 1.

4. A computer-readable medium storing a computer program implementing the method of claim 1.

5. The method of claim 1 where identifying Candidate Descendants for the each Active Candidate Trajectory or the Candidate Terminal Centroid for the one of the one or more Candidate Trajectories includes, if no centroids in the Centroid List have both a time coordinate equal to the time $t_C$ and a location coordinate within the Descendant Search Area, and if at least one time coordinate in the Centroid Population immediately chronologically succeeds the time $t_C$, and if a predetermined limit on chronologically sequential imaginary centroids in a Trajectory Centroid Population is not exceeded, establishing an imaginary centroid as the one or more Candidate Descendants for the each Active Candidate Trajectory, or if the predetermined limit on chronologically sequential imaginary centroids in a Trajectory Centroid Population is exceeded, determining a chronologically latest centroid that is both in the each Active Candidate Trajectory's Trajectory Centroid Population and in the Centroid Population, such that the chronologically latest centroid is a real centroid, and establishing the chronologically latest centroid as the Candidate Terminal Centroid for the one of the one or more Candidate Trajectories.

6. The method of claim 5 including setting an maximum centroid count, where the maximum centroid count is a maximum number of real or imaginary centroids in the Trajectory Centroid Population of the each Active Candidate Trajectory, such that when a number of real or imaginary centroids in the Trajectory Centroid Population of the each Active Candidate Trajectory is equal to the maximum centroid count, a centroid in the each Active Candidate Trajectory's Trajectory Centroid Population having the chronologically latest time coordinate is the Candidate Terminal Centroid for the one of the one or more Candidate Trajectories.

7. The method of claim 1 where the First Generation Search Area is a circle centered on the 0-Generation Candidate having a radius equal to the Search Velocity times a time interval, where the time interval is equal to the difference between the $(t_0+1)$ and the $t_0$, and where the 1-Generation Centroids are one or more centroids on the Centroid List having a location coordinate within the First Generation Search Area and having a time coordinate equal to the $(t_0+1)$.

8. The method of claim 1 where defining the Descendant Search Area for the each Active Candidate Trajectory at the time $t_C$ and identifying Candidate Descendants for the each Active Candidate Trajectory is conducted by:
establishing a $(t_C-1)$ centroid, where the $(t_C-1)$ centroid is a real or imaginary centroid in the each Active Candidate Trajectory's Trajectory Centroid Population having a time coordinate that immediately chronologically precedes the time $t_C$;
establishing a $(t_C-2)$ centroid, where the $(t_C-2)$ centroid is a real or imaginary centroid in the each Active Candidate Trajectory's Trajectory Centroid Population that immediately chronologically precedes the $(t_C-1)$ centroid;
determining a $D_0$, where the $D_0$ is the displacement between the $(t_C-2)$ centroid location coordinates and the $(t_C-1)$ centroid location coordinates,
establishing a descendant axis, where the descendant axis is a line passing through the location coordinate of the $(t_C-2)$ centroid and the location coordinate of the $(t_C-1)$ centroid;
defining a first circular arc, where the first circular arc has a radius equal to a maximum radius and an arc length equal to the maximum radius times twice a tangential acceleration, where the tangential acceleration is an angle measured from the descendant axis, and where the maximum radius is greater than the $D_0$, and locating the first circular arc such that the descendant axis bisects the first circular arc and all points on the first circular arc are separated from the $(t_C-2)$ centroid location coordinates by a distance equal to the maximum radius;
defining a second circular arc, where the second circular arc has a radius equal to a minimum radius and an arc length equal to the minimum radius times twice the tangential acceleration, where the minimum radius is less than the maximum radius and the minimum radius is greater than the $D_0$, and locating the second circular arc such that the descendant axis bisects the second circular arc and all points on the second circular arc are separated from the $(t_C-2)$ centroid location coordinates by a distance equal to the minimum radius;
defining a first line segment from a first endpoint of the first circular arc to a first endpoint of the second circular arc, and defining a second line segment extending from a second endpoint of the first circular arc to an endpoint of the second circular arc most proximate to the second endpoint, such that the first line segment and the second line segment do not intersect;
defining the Descendant Search Area for the each Active Candidate Trajectory at the time $t_C$ as the area bounded by the first circular arc, the second circular arc, the first line segment, and the second line segment; and
identifying Candidate Descendants by identifying centroids on the Centroid List having both a location coordinate within the descendant search area and a time coordinate equal to the time $t_C$;
thereby defining the Descendant Search Area for the each Active Candidate Trajectory at the time $t_C$ and identifying Candidate Descendants for the each Active Candidate Trajectory.

9. The method of claim 1 where the Descendant Search Area is inversely proportional to the Search Velocity.

10. The method of claim 8 where the maximum radius is based on the $D_O$ and a starting maximum acceleration $A_{MAX\_START}$ which may occur over the $D_O$, and where the minimum radius is based on the $D_O$ and an ending minimum acceleration $A_{MAX\_END}$ which may occur over the $D_O$.

11. The method of claim 10 where the maximum radius, the minimum radius, and the tangential acceleration are determined according to:

$$\beta = (V\_Search - V\_Min)/(V\_Max - V\_Min)$$

$$R_{MAX} = D_0[2 + A_{MAX\_START} + (A_{MAX\_START} - A_{MAX\_END}) \beta^{(V\_Min-V\_Search)}],$$

$$R_{MIN} = D_0[2 - A_{MAX\_START} - (A_{MAX\_START} - A_{MAX\_END}) \beta^{(V\_Min-V\_Search)}],$$

$$\phi_{MAX} = \phi_{END} + [\phi_{START} - \phi_{END} \beta^{(V\_Min-V\_Search)}]$$

where
V_Search is the Search Velocity,
V_Min is the minimum search velocity,
V_Max is the maximum search velocity,
$A_{MAX\_START}$ is a first maximum acceleration, where $0 \leq A_{MAX\_START} \leq 1$,
$A_{MAX\_END}$ is a second maximum acceleration, where $0 \leq A_{MAX\_END} \leq 1$, and where $A_{MAX\_START} \leq A_{MAX\_END}$,
$\phi_{START}$ is a first angular acceleration,
$\phi_{END}$ is a second angular acceleration, where $\phi_{START} \leq \phi_{END}$,
$R_{MAX}$ is the maximum radius,
$R_{MIN}$ is the minimum radius and,
$\phi_{MAX}$ is the tangential acceleration.

12. The method of claim 1 including setting a maximum centroid count and terminating the each of the one or more Candidate Trajectories if the number of centroids in the each of the one or more Candidate Trajectories exceeds the maximum centroid count.

13. The method of claim 12 including establishing a starting centroid count and an ending centroid count, and determining the maximum centroid count according to:

$$\beta = (V\_Search - V\_Min)/(V\_Max - V\_Min);$$

$$L_{MAX} = L_{MAX\_START} + (L_{MAX\_END} - L_{MAX\_START})\beta;$$

where,
V_Search is the Search Velocity,
V_Min is the minimum search velocity,
V_Max is the maximum search velocity,
$L_{MAX\_START}$ is the starting centroid count and,
$L_{MAX\_END}$ is the ending centroid count, where $L_{MAX\_END} > L_{MAX\_START}$.

14. The method of claim 1 including setting a minimum centroid count and where comparing the Candidate Terminal Centroids of the one or more Candidate Trajectories includes selecting a single Candidate Terminal Centroid, where the single Candidate Terminal Centroid is one of the Candidate Terminal Centroids of the one or more Candidate Trajectories, and determining a number of centroids in a Trajectory Centroid Population comprised by the single Candidate Terminal Centroid, and if the number of centroids in the Trajectory Centroid Population comprised by the single Candidate Terminal Centroid is less than the minimum centroid count, removing the single Candidate Terminal Centroid from the Candidate Terminal Centroids of the one or more Candidate Trajectories, until each of the Candidate Terminal Centroids of the one or more Candidate Trajectories has been selected as the single Candidate Terminal Centroid.

15. The method of claim 14 including establishing a starting centroid count and an ending centroid count, and determining the minimum centroid count according to:

$$\beta = (V\_Search - V\_Min)/(V\_Max - V\_Min);$$

$$L_{MIN} = L_{MIN\_START} + (L_{MIN\_END} - L_{MIN\_START})\beta;$$

where,
V_Search is the Search Velocity,
V_Min is the minimum search velocity,
V_Max is the maximum search velocity,
$L_{MIN\_START}$ is the starting centroid count and,
$L_{MIN\_END}$ is the ending centroid count, where $L_{MIN\_END} > L_{MIN\_START}$.

16. A method of particle trajectory recognition for a Centroid Population comprising:
A) obtaining the Centroid Population, where the Centroid Population is comprised of a plurality of centroids and where each centroid in the plurality of centroids has an (x, y, t) coordinate, where x and y are location coordinates that define the location of the centroid with respect to a fixed two-dimensional coordinate system, and where t is a time coordinate indicating a time with respect to a fixed time reference at which the each centroid is located at the x and y location coordinates, where t is a member of a finite set of time coordinates, and where each element in the finite set of time coordinates describes the time coordinate of at least one centroid;
B) setting a minimum search velocity and setting a maximum search velocity greater than the minimum search velocity, and generating a finite set of velocities, where the finite set of velocities includes the minimum search velocity and the maximum search velocity as set elements, and where every other element in the finite set of velocities is greater than the minimum search velocity and less than the maximum search velocity;
C) establishing a Centroid List, where the Centroid List is comprised of all centroids in the Centroid Population;
D) setting a Search Velocity equal to the minimum search velocity; and
E) realizing centroid trajectories and reducing the Centroid List by defining search areas, identifying 0-Generation Centroids, and establishing Candidate Trajectories for the Search Velocity by,
  1) analyzing centroids on the Centroid List in chronological order based on the time coordinates of the centroids on the Centroid List, and reducing the Centroid List, by,
    a) determining a $t_0$, where the $t_0$ is the earliest-in-time time coordinate from among the time coordinates of the centroids on the Centroid List, and selecting a O-generation Candidate, where the O-generation Candidate is a centroid on the Centroid List having a time coordinate equal to the $t_0$,
    b) defining a First Generation Search Area around the 0-Generation Candidate based on the Search Velocity and a time interval, where the time interval is a chronological difference between the $t_0$ and a $(t_0+1)$, where the $(t_0+1)$ is a time coordinate in the Centroid Population which immediately chronologically succeeds $t_0$,
    c) identifying one or more 1-Generation Centroids, where a 1-Generation Centroid is a centroid on the Centroid List having a location coordinate within the First Generation Search Area and having a time coordinate equal to the $(t_0+1)$,
    d) establishing, if one or more 1-Generation Centroids are identified, the 0-Generation Candidate as a 0-Generation Centroid, and establishing and growing a Candidate Trajectory Tree originating at the 0-Generation Centroid, by establishing a $(t_0+2)$, where the $(t_0+2)$ is a time coordinate in the Centroid Population which immediately chronologically succeeds the $(t_0+1)$, and defining a Realized Trajectory for the 0-Generation Centroid, by,
      i) establishing the Candidate Trajectory Tree originating at the 0-Generation Centroid, where the Candidate Trajectory Tree is comprised of one or more Candidate Trajectories, and where each of the one or more Candidate Trajectories has a Trajectory Centroid Population comprised of the 0-Generation Centroid and one of the one or more 1-Generation Centroids,
      ii) growing the Candidate Trajectory Tree by analyzing at a $t_C$, where the $t_C$ is a time coordinate, in chronological order, beginning with the $t_C$ equal to the $(t_0+2)$ and continuing until each of the one or more Candidate Trajectories terminates by,
        1) defining a $(t_C-1)$, where the $(t_C-1)$ is a time coordinate in the Centroid Population which immediately chronologically precedes the $t_C$,
        2) identifying Active Candidate Trajectories, where an Active Candidate Trajectory is one of the one or more Candidate Trajectories, where the Trajectory Centroid Population of the one of the one or more Candidate Trajectories includes a real or imaginary centroid having a time coordinate equal to the $(t_C-1)$, and where the Trajectory Centroid Population of the one of the one or more Candidate Trajectories does not include a Candidate Terminal Centroid, and for each Active Candidate Trajectory, identifying Candidate Descendants for the each Active Candidate Trajectory or the Candidate Terminal Centroid for the one of the one or more candidate trajectories, by, a) establishing a Descendant Search Area for the each Active Candidate Trajectory, where the Descendant Search Area is a bounded area based on the location coordinates of one or more centroids in the each Active Candidate Trajectory's Trajectory Centroid Population, b) establishing the one or more Candidate Descendants for the each Active Candidate Trajectory or establishing the Candidate Terminal Centroid for the one of the one or more Candidate Trajectories by, i) establishing, if one or more centroids on the Centroid List have both a time coordinate equal to the $t_C$ and a location coordinate within the Descendant Search Area, and if at least one time coordinate in the Centroid Population immediately chronologically succeeds the $t_C$, the one or more centroids as the one or more Candidate Descendants for the each Active Candidate Trajectory, or, ii) establishing, if no centroids on the Centroid List have both a time coordinate equal to the $t_C$ and a location coordinate within the Descendant Search Area, and if at least one time coordinate in the Centroid Population immediately chronologically succeeds the $t_C$, an imaginary centroid within the Descendant Search Area, and if a predetermined limit on chronologically sequential imaginary centroids in a Trajectory Centroid Population is not exceeded, establishing the imaginary centroid as the one or more Candidate Descendants for the each Active Candidate Trajectory, or if the predetermined limit on chronologically sequential imaginary centroids in a Trajectory Centroid Population is exceeded, establishing the Candidate Terminal Centroid for the one of the one or more Candidate Trajectories and thereby terminating the one of the one or more Candidate Trajectories, or iii) establishing, if one or more centroids on the Centroid List have both a time coordinate equal to the $t_C$ and a location coordinate within the Descendant Search Area, and if no time coordinate in the Centroid Population immediately chronologically succeeds the $t_C$, the Candidate Terminal Centroid for the one of the one or more Candidate Trajectories, thereby terminating the one of the one or more Candidate Trajectories, where the Candidate Terminal Centroid is one of the one or more centroids on the Centroid List having both a time coordinate equal to the $t_C$ and a location coordinate within the Descendant Search Area, thereby establishing the one or more Candidate Descendants for the each Active Candidate Trajectory or establishing the Candidate Terminal Centroid for the one of the one or more Candidate Trajectories in accordance with step E) 1) d) ii) 2) b), c) adding to the one or more Candidate Trajectories, if the each Active Candidate Trajectory has one or more Candidate Descendants, a trajectory for each of the one or more Candidate Descendants, where the trajectory for the each of the one or more Candidate Descendants has a Trajectory Centroid Population comprised of the each Active Candidate Trajectory's Trajectory Centroid Population and the each of the one or more Candidate Descendants, and eliminating the each Active Candidate Trajectory from the one or more Candidate Trajectories, thereby providing Candidate Trajectories for consideration as Active Candidate Trajectories during analysis of the chronologically following time interval, d) repeating steps E) 1) d) ii) 2) a) through E) 1) d) ii) 2) d) for all Active Candidate Trajectories, thereby identifying Active Candidate Trajectories, where an Active Candidate Trajectory is one of the one or more Candidate Trajectories, and for each Active Candidate Trajectory, identifying Candidate Descendants for the each Active Candidate Trajectory or the Candidate Terminal Centroid for the one of the one or more Candidate Trajectories in accordance with step E) 1) d) ii) 2), 3) determining a next $t_C$, where the next $t_C$ is a time coordinate in the Centroid Population which immediately chronologically succeeds the $t_C$, and setting the $t_C$ equal to the next $t_C$, and repeating steps E) 1) d) ii) 1) through E) 1) d) ii) 3) until each of the one or more Candidate Trajectories terminates, thereby growing the Candidate Trajectory Tree by analyzing in chronological order until each of the one or more Candidate Trajectories terminates in accordance with step E) 1) d) ii), iii) comparing the Candidate Terminal Centroids of the one or more Candidate Trajectories and identifying a Realized Terminal Centroid, where the Realized Terminal Centroid is a single Candidate Terminal Centroid from among the Candidate Terminal Centroids of the one or more Candidate Trajectories, and where the single Candidate Terminal Centroid has a chronologically latest time coordinate from among the Candidate Terminal Centroids of the one or more Candidate Trajectories, iv) defining a Realized Trajectory for the 0-Generation Centroid, where the Realized Trajectory is a single trajectory from the one or more candidate trajectories, and where the single trajectory from the one or more Candidate Trajectories is the one or more Candidate Trajectory which includes the Realized Terminal Centroid, thereby growing a Candidate Trajectory Tree originating at the 0-Generation Centroid and defining the Realized Trajectory for the 0-Generation Centroid in accordance with step E) 1) d), e) eliminating the Trajectory Centroid Population of the Realized Trajectory for the 0-Generation Centroid from the Centroid List, thereby reducing the Centroid List, f) repeating steps E) 1) a) through E) 1) e) for each centroid in the Centroid List in chronological order until all centroids on the Centroid List have been analyzed, thereby analyzing centroids on the Centroid List in chronological order based on the time coordinates of the centroids on the Centroid List, and reducing the Centroid List in accordance with step E) 1), 2) determining a next velocity from the finite set of velocities, where the next velocity is greater than the Search Velocity, and where the next velocity is less than all other members of the finite set of velocities that are greater than the Search Velocity, and setting the Search Velocity equal to the next velocity, and repeating step E) 1) until all members of the finite set of velocities have been utilized as the Search Velocity, thereby performing the method of particle trajectory recognition for the Centroid Population.

17. The method of claim 16 where obtaining the Centroid Population is accomplished by, generating a plurality of frames depicting imaged particles in a flow field over a time period using an equivalent field of view in each frame and a constant time interval between each frame, such that an imaged particle depicted in any frame may be located with respect to the field of view and such that each frame in the plurality of frames has a unique time identifier, and processing the plurality of frames depicting imaged particles to create the Centroid List, where each centroid in the Centroid List corresponds to an imaged particle on a single frame in the plurality of frames, such that the each centroid has an (x, y, t) coordinate where x and y are location coordinates that define the location of the imaged particle on the single frame with reference to the field of view, and t is a time coordinate corresponding to the unique time identifier of the single frame in the plurality of frames.

18. A digital computer system programmed to perform the method of claim 16.

19. A computer-readable medium storing a computer program implementing the method of claim 16.

20. The method of claim 16 including setting a maximum centroid count, and including determining, prior to establishing the one or more Candidate Descendants for the each Active Candidate Trajectory or establishing the Candidate Terminal Centroid for the one of the one or more Candidate Trajectories, a centroid count for the each Active Candidate Trajectory, where the centroid count is the amount of centroids in the each Active Candidate Trajectory's Trajectory Centroid Population, and, if both the centroid count is equal to the maximum centroid count minus one and if the one or more Candidate Descendants for the each Active Candidate Trajectory is not the imaginary centroid, establishing one of the one or more Candidate Descendants for the each Active Candidate Trajectory as the Candidate Terminal Centroid for the for the one of the one or more Candidate Trajectories, or, if the centroid count is equal to the maximum centroid count minus one and if the one or more Candidate Descendants for the each Active Candidate Trajectory is the imaginary centroid, determining a single centroid in the each Active Candidate Trajectory's Trajectory Centroid Population, where the single centroid is a real centroid and where a time coordinate of the single centroid is chronologically later than a time coordinate of any other real centroid in the each Active Candidate Trajectory's Trajectory Centroid Population, and establishing the single centroid as the Candidate Terminal Centroid for the for the one of the one or more Candidate Trajectories.

21. The method of claim 16 where the First Generation Search Area is a circle centered on the 0-Generation Candidate having a radius equal to the Search Velocity times the constant time interval, and where defining the Descendant Search Area for the each Active Candidate Trajectory is conducted by:

establishing a ($t_C$–1) centroid, where the ($t_C$–1) centroid is a real or imaginary centroid in the each Active Candidate Trajectory's Trajectory Centroid Population having a time coordinate equal to the ($t_C$–1);

establishing a ($t_C$–2) centroid, where the ($t_C$–2) centroid is a real or imaginary centroid in the each Active Candidate Trajectory's Trajectory Centroid Population having a time coordinate equal to a ($t_C$–2), where the ($t_C$–2) is a time coordinate in the Centroid Population which immediately chronologically precedes the ($t_C$–1);

determining a $D_0$, where the $D_0$ is the displacement between the ($t_C$–2) centroid location coordinates and the ($t_C$–1) centroid location coordinates;

establishing a descendant axis, where the descendant axis is a line passing through the location coordinate of the ($t_C$–2) centroid and the location coordinate of the ($t_C$–1) centroid;

defining a first circular arc, where the first circular arc has a radius equal to a maximum radius and an arc length equal to the maximum radius times twice a tangential acceleration, where the tangential acceleration is an angle measured from the descendant axis, and where the maximum radius is greater than the $D_0$, and locating the first circular arc such that the descendant axis bisects the first circular arc and all points on the first circular arc are separated from the ($t_C$–2) centroid location coordinates by a distance equal to the maximum radius;

defining a second circular arc, where the second circular arc has a radius equal to a minimum radius and an arc length equal to the minimum radius times twice the tangential acceleration, where the minimum radius is less than the maximum radius and the minimum radius is greater than the $D_0$, and locating the second circular arc such that the descendant axis bisects the second circular arc and all points on the second circular arc are separated from the ($t_C$–2) centroid location coordinates by a distance equal to the minimum radius;

defining a first line segment from a first endpoint of the first circular arc to a first endpoint of the second circular arc, and defining a second line segment extending from a second endpoint of the first circular arc to an endpoint of the second circular arc most proximate to the second endpoint, such that the first line segment and the second line segment do not intersect; and defining the Descendant Search Area for the each Active Candidate Trajectory as the area bounded by the first circular arc, the second circular arc, the first line segment, and the second line segment.

22. The method of claim 16 where the Descendant Search Area is inversely proportional to the Search Velocity.

23. The method of claim 21 where the maximum radius is based on the $D_O$ and a starting maximum acceleration $A_{MAX\_START}$ which may occur over the $D_O$, and where the minimum radius is based on the $D_O$ and an ending minimum acceleration $A_{MAX\_END}$ which may occur over the $D_O$.

24. The method of claim 23 where the maximum radius, the minimum radius, and the tangential acceleration are determined according to:

$$\beta = (V\_Search - V\_Min)/(V\_Max - V\_Min)$$

$$R_{MAX} = D_0[2 + A_{MAX\_START} + (A_{MAX\_START} - A_{MAX\_END}) \beta^{(V\_Min - V\_Search)}],$$

$$R_{MIN} = D_0[2 - A_{MAX\_START} - (A_{MAX\_START} - A_{MAX\_END}) \beta^{(V\_Min - V\_Search)}],$$

$$\phi_{MAX} = \phi_{END} + [\phi_{START} - \phi_{END} \beta^{(V\_Min - V\_Search)}]$$

where
- V_Search is the Search Velocity,
- V_Min is the minimum search velocity,
- V_Max is the maximum search velocity,
- $A_{MAX\_START}$ is a first maximum acceleration, where $0 \leq A_{MAX\_START} \leq 1$,
- $A_{MAX\_END}$ is a second maximum acceleration, where $0 \leq A_{MAX\_END} \leq 1$, and where $A_{MAX\_START} \leq A_{MAX\_END}$,
- $\phi_{START}$ is a first angular acceleration,
- $\phi_{END}$ is a second angular acceleration, where $\phi_{START} \leq \phi_{END}$,
- $R_{MAX}$ is the maximum radius,
- $R_{MIN}$ is the minimum radius and,
- $\phi_{MAX}$ is the tangential acceleration.

25. The method of claim 16 including setting a maximum centroid count and where establishing the one or more Candidate Descendants for the each Active Candidate Trajectory or establishing the Candidate Terminal Centroid for the one of the one or more Candidate Trajectories includes:
   determining a number of centroids in the each Active Candidate Trajectory's Trajectory Centroid Population; and
   establishing, if the number of centroids in the each Active Candidate Trajectory's Trajectory Centroid Population is equal to the maximum centroid count minus one, a single centroid, where the single centroid comprises the one or more Candidate Descendants, and establishing the single centroid as the Candidate Terminal Centroid for the one of the one or more Candidate Trajectories.

26. The method of claim 25 including establishing a starting centroid count and an ending centroid count, and determining the maximum centroid count according to:

$$\beta = (V\_Search - V\_Min)/(V\_Max - V\_Min);$$

$$L_{MAX} = L_{MAX\_START} + (L_{MAX\_END} - L_{MAX\_START})\beta;$$

where,
- V_Search is the Search Velocity,
- V_Min is the minimum search velocity,
- V_Max is the maximum search velocity,
- $L_{MAX\_START}$ is the starting centroid count and,
- $L_{MAX\_END}$ is the ending centroid count, where $L_{MAX\_END} > L_{MAX\_START}$.

27. The method of claim 16 including setting a minimum centroid count and where comparing the Candidate Terminal Centroids of the one or more Candidate Trajectories and identifying a Realized Terminal Centroid includes selecting an evaluation Candidate Terminal Centroid, where the evaluation Candidate Terminal Centroid is one of the Candidate Terminal Centroids of the one or more Candidate Trajectories, and determining a number of centroids in a Trajectory Centroid Population comprised by the evaluation Candidate Terminal Centroid, and if the number of centroids in the Trajectory Centroid Population comprised by the evaluation Candidate Terminal Centroid is less than the minimum centroid count, removing the evaluation Candidate Terminal Centroid from the Candidate Terminal Centroids of the one or more Candidate Trajectories, until each of the Candidate Terminal Centroids of the one or more Candidate Trajectories has been selected as the evaluation Candidate Terminal Centroid.

28. The method of claim 27 including establishing a starting centroid count and an ending centroid count, and determining the minimum centroid count according to:

$$\beta = (V\_Search - V\_Min)/(V\_Max - V\_Min);$$

$$L_{MIN} = L_{MIN\_START} + (L_{MIN\_END} - L_{MIN\_START})\beta;$$

where,
- V_Search is the Search Velocity,
- V_Min is the minimum search velocity,
- V_Max is the maximum search velocity,
- $L_{MIN\_START}$ is the starting centroid count and,
- $L_{MIN\_END}$ is the ending centroid count, where $L_{MIN\_END} > L_{MIN\_START}$.

* * * * *